US010753757B2

(12) United States Patent
Tsurumi et al.

(10) Patent No.: US 10,753,757 B2
(45) Date of Patent: Aug. 25, 2020

(54) INFORMATION PROCESSING APPARATUS AND INFORMATION PROCESSING METHOD

(71) Applicant: SONY CORPORATION, Tokyo (JP)

(72) Inventors: Shingo Tsurumi, Saitama (JP); Masashi Eshima, Chiba (JP); Akihiko Kaino, Kanagawa (JP); Takaaki Kato, Tokyo (JP); Masaki Fukuchi, Tokyo (JP); Suguru Aoki, Tokyo (JP); Takuto Motoyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 166 days.

(21) Appl. No.: 15/761,232

(22) PCT Filed: Sep. 16, 2016

(86) PCT No.: PCT/JP2016/077400
§ 371 (c)(1),
(2) Date: Mar. 19, 2018

(87) PCT Pub. No.: WO2017/057044
PCT Pub. Date: Apr. 6, 2017

(65) Prior Publication Data
US 2018/0259353 A1  Sep. 13, 2018

(30) Foreign Application Priority Data
Sep. 30, 2015 (JP) .................. 2015-193358

(51) Int. Cl.
*G01C 21/36* (2006.01)
*G06T 1/00* (2006.01)
(Continued)

(52) U.S. Cl.
CPC .......... *G01C 21/3602* (2013.01); *B60R 21/00* (2013.01); *B60W 40/10* (2013.01);
(Continued)

(58) Field of Classification Search
CPC .... G01C 21/3602; G01C 21/28; G01C 21/30; B60R 21/00; B60W 40/10;
(Continued)

(56) References Cited

U.S. PATENT DOCUMENTS 6,438,491 B1 * 8/2002 Farmer .................. G08G 1/164
701/301
6,470,272 B2 * 10/2002 Cong .................... G01S 13/723
701/301

(Continued)

FOREIGN PATENT DOCUMENTS

JP  2004-322772 A  11/2004
JP  2007-178271 A  7/2007

(Continued)

OTHER PUBLICATIONS

International Search Report & Written Opinion of PCT Application No. PCT/JP2016/077400, dated Nov. 29, 2016, 10 pages.

*Primary Examiner* — Calvin Cheung
(74) *Attorney, Agent, or Firm* — Chip Law Group

(57) ABSTRACT

An information processing apparatus and an information processing method enables enhancement of accuracy in recognition of locations of a moving body. The information processing apparatus is arranged on a moving body and includes an own-location recognition block that recognizes, based on an image taken from the moving body, a first own location of the moving body. A moving body recognition block recognizes a relative location of another moving body relative to the moving body in the image taken from the moving body, and a communication block executes communication with the another moving body to obtain the absolute location of the another moving body, An own location computation block computes, based on the absolute location of the another moving body and the relative loca- (Continued)

tion of the another moving body, a second own location of the moving body.

11 Claims, 13 Drawing Sheets

(51) Int. Cl.
| | |
|---|---|
| *B60R 21/00* | (2006.01) |
| *G01C 21/28* | (2006.01) |
| *G01S 13/931* | (2020.01) |
| *G08G 1/16* | (2006.01) |
| *G08G 1/0967* | (2006.01) |
| *G01S 5/00* | (2006.01) |
| *G01S 13/86* | (2006.01) |
| *G01S 17/931* | (2020.01) |
| *B60W 40/10* | (2012.01) |
| *G01C 21/30* | (2006.01) |

(52) U.S. Cl.
CPC ............ *G01C 21/28* (2013.01); *G01C 21/30* (2013.01); *G01S 5/0072* (2013.01); *G01S 13/867* (2013.01); *G01S 13/931* (2013.01); *G01S 17/931* (2020.01); *G06T 1/00* (2013.01); *G08G 1/09675* (2013.01); *G08G 1/096791* (2013.01); *G08G 1/161* (2013.01); *B60W 2554/80* (2020.02); *B60W 2754/10* (2020.02); *G01S 2013/9323* (2020.01); *G01S 2013/9324* (2020.01); *G01S 2013/93271* (2020.01); *G01S 2013/93272* (2020.01); *G01S 2013/93274* (2020.01)

(58) Field of Classification Search
CPC ......... B60W 2550/30; B60W 2750/306; G01S 5/0072; G01S 13/867; G01S 13/931; G01S 17/936; G01S 2013/9364; G01S 2013/9367; G01S 2013/9375; G01S 2013/9378; G01S 2013/9385; G06T 1/00; G08G 1/09675; G08G 1/096791; G08G 1/161
See application file for complete search history.

(56) References Cited

U.S. PATENT DOCUMENTS

| | | | |
|---|---|---|---|
| 8,260,036 B2* | 9/2012 | Hamza | B64G 1/646 382/154 |
| 2010/0098297 A1* | 4/2010 | Zhang | B60W 30/09 382/104 |
| 2010/0256852 A1* | 10/2010 | Mudalige | G08G 1/163 701/24 |
| 2017/0243485 A1* | 8/2017 | Rubin | G08G 1/052 |
| 2019/0001987 A1* | 1/2019 | Kim | B60W 30/165 |
| 2019/0385328 A1* | 12/2019 | Grosse-Kunstleve | H04N 5/2257 |

FOREIGN PATENT DOCUMENTS

| | | |
|---|---|---|
| JP | 2008-164384 A | 7/2008 |
| JP | 2012-112691 A | 6/2012 |
| JP | 2014-078171 A | 5/2014 |
| JP | 2015-114126 A | 6/2015 |
| WO | 2015/087502 A1 | 6/2015 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/077400 filed on Sep. 16, 2016, which claims priority benefit of Japanese Patent Application No. JP 2015-193358 filed in the Japan Patent Office on Sep. 30, 2015. Each of the above-referenced applications is hereby incorporated herein by reference in its entirety.

TECHNICAL FIELD

The present technology relates to an information processing apparatus and an information processing method and, more particularly, to an information processing apparatus and an information processing method that are configured to enhance the accuracy of recognizing the position of a moving body.

BACKGROUND ART

A system for measuring the location of a vehicle by use of GPS (Global Positioning System) is in popular use (refer to PTL 1, for example).

However, if a system based on GPS cannot receive electromagnetic waves from a GPS satellite, such a system cannot correctly measure the location of the vehicle. This trouble is especially conspicuous in urban areas where buildings are crowded. In addition, the measuring accuracy of GPS in private use is approximately 10 meters that is not accurate enough.

Therefore, in these days, the development of technologies for recognizing vehicle locations by use of SLAM (Simultaneous Localization and Mapping) is under way. Use of SLAM provides an accuracy of as short as several centimeters in the recognition of vehicle locations without considering electromagnetic-wave receiving conditions.

CITATION LIST

Patent Literature

[PTL 1]
JP 2014-78171A

SUMMARY

Technical Problem

However, with a system using SLAM, the absolute location of a vehicle is recognized on the basis of a relative location of the vehicle relative to a stationary object in an image taken from the vehicle. Therefore, if the vehicle is surrounded by other vehicles because of traffic congestion, for example, the feature points of a stationary object in the image cannot be sufficiently detected, thereby making it possible for the accuracy in recognizing vehicle locations to be lowered.

Therefore, the present technology addresses the above-identified and other problems associated with related-art methods and apparatuses and solves the addressed problems by enhancing the accuracy in recognizing the locations of moving bodies such as vehicles.

Solution to Problem

In carrying out the technology and according one aspect thereof, there is provided an information processing apparatus arranged on a moving body. This information processing apparatus includes an own-location recognition block configured to recognize, on the basis of an image taken from the moving body, a first own location that is an absolute location of the moving body; a moving body recognition block configured to recognize a relative location relative to the moving body of another moving body in the image taken from the moving body; a communication block configured to execute communication with the another moving body so as to obtain the absolute location of the another moving body; and an own location computation block configured to compute, on the basis of the absolute location of the another moving body and the relative location of the another moving body, a second own location that is an absolute location of the moving body.

The information processing apparatus may further include a first confidence computation block configured to compute a first confidence that is a confidence in the first own location.

The information processing apparatus may still further include a second confidence computation block configured to compute a confidence in a relative location of the another moving body, in which the reception block further obtains a confidence in an absolute location of the another moving body; and the own location computation block may compute, on the basis of the confidence in the relative location of the another moving body and the confidence in the absolute location of the another moving body, a second confidence that is a confidence in the second own location.

The information processing apparatus may yet further include an output control block configured to control, on the basis of the first confidence and the second confidence, outputting of the first own location and the second own location.

In the information processing apparatus, the own location computation block may compute, on the basis of the first own location, the second own location, the first confidence, and the second confidence, a third own location that is an absolute location of the moving body.

The information processing apparatus may further include an output control block configured to control outputting of the third own location.

The information processing apparatus may still further include an output control block configured to control, on the basis of the first confidence, outputting of the first own location and the second own location.

In the information processing apparatus, if the first confidence is lower than a predetermined threshold value, the moving body recognition block may recognize a relative location of the another moving body, the communication block may communicate with the another moving body so as to obtain an absolute location of the another moving body, and the own location computation block may compute the second own location.

In the information processing apparatus, the communication block may enquire whether a moving body around the moving body recognizes an absolute location or not and obtains an absolute location from the moving body recognizing the absolute location.

In the information processing apparatus, the recognition block may recognize, on the basis of a feature point inside an image taken from the moving body and a relative location relative to the moving body, a location of the moving body.

In carrying out the technology and according to another aspect thereof, there is provided an information processing method. This information processing method includes the steps that are executed by an information processing apparatus arranged on a moving body: recognizing, on the basis of an image taken from the moving body, a first own location that is an absolute location of the moving body; recognizing a relative location relative to the moving body of another moving body in the image taken from the moving body; executing communication with the another moving body so as to obtain the absolute location of the another moving body; and computing, on the basis of the absolute location of the another moving body and the relative location of the another moving body, a second own location that is an absolute location of the moving body.

In one aspect of the present technology, on the basis of an image taken from the moving body, a first own location that is an absolute location of the moving body is recognized; a relative location relative to the moving body of another moving body in the image taken from the moving body is recognized; communication with the another moving body is executed so as to obtain the absolute location of the another moving body; and, on the basis of the absolute location of the another moving body and the relative location of the another moving body, a second own location that is an absolute location of the moving body is computed.

Advantageous Effect of Invention

According to one aspect of the present technology, the accuracy in the recognition of locations of a moving body can be enhanced.

It should be noted that the effects described here are not necessarily restricted; namely, any other effects described in the present disclosure may be available.

DESCRIPTION OF EMBODIMENTS

The following describes modes (also referred to as embodiments) of practicing the present technology. It should be noted that the description will be done in the following sequence.
1. First Embodiment
2. Second embodiment (in which a solely recognized own location and a jointly recognized own location are composed)
3. Variations
4. Applications 1. First Embodiment To begin with, the first embodiment of the present technology is described with reference to FIG. 1 through FIG. 7.
{Exemplary Configuration of an Information Processing System 11}

Figure 1:
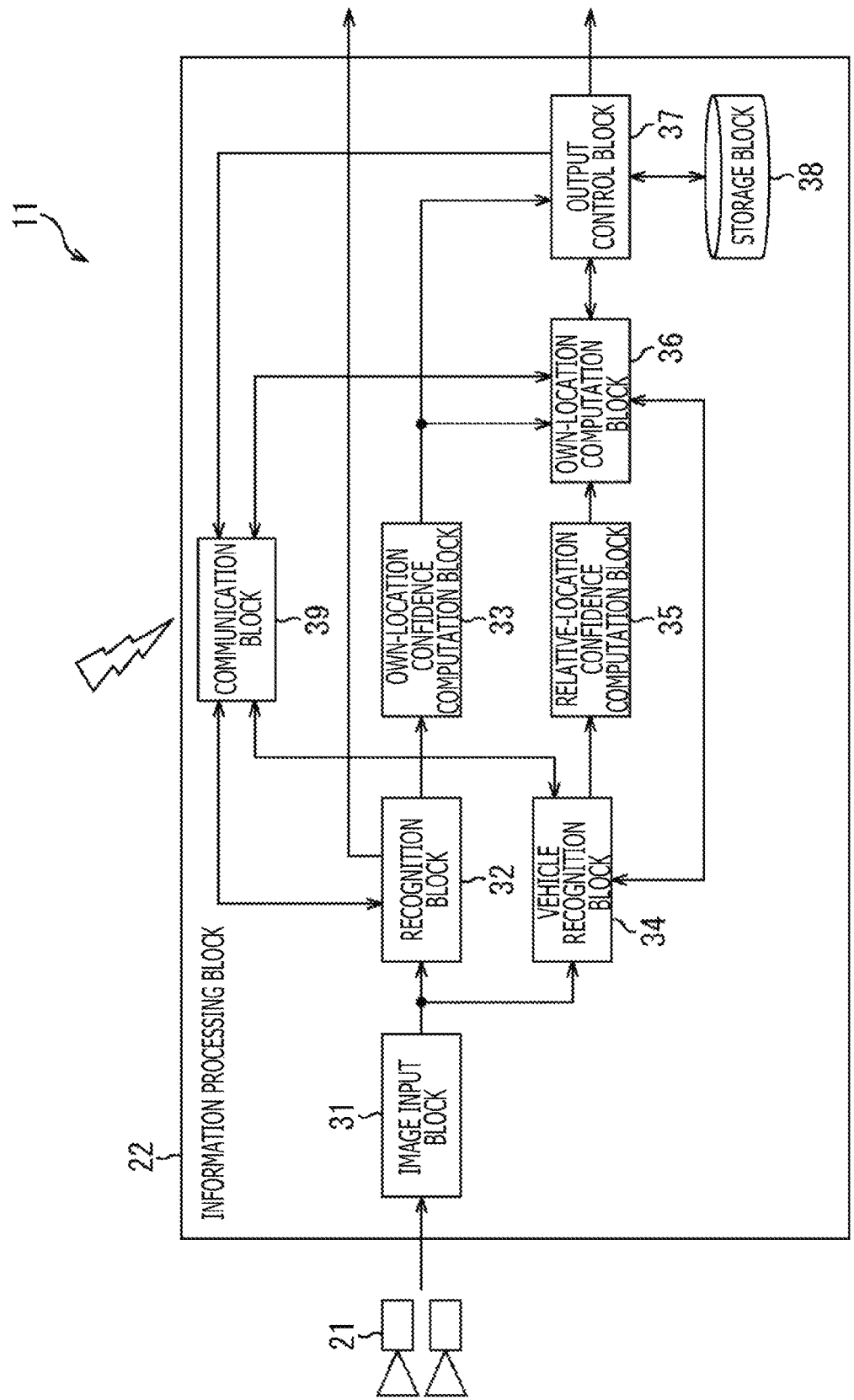
FIG. 1 is a block diagram illustrating one embodiment of an information processing system to which the present technology is applied.

FIG. 1 depicts one embodiment of the information processing system 11 to which the present technology is applied.

The information processing system 11 is a system that is used aboard a car and includes an in-car information terminal such as a car navigation system or an autonomous driving system. The information processing system 11 recognizes, solely or jointly with the information processing system 11 installed on another vehicle, the absolute location of a vehicle having the information processing system 11.

It should be noted that a vehicle having the information processing system 11 is sometimes referred to as an own vehicle mainly for the purpose of distinction from other vehicles. Further, in what follows, the absolute location of a vehicle having the information processing system 11 is sometimes referred to as an own location mainly for the purpose of distinction from the absolute locations of other vehicles.

The information processing system 11 is configured so as to include a camera block 21 and an information processing block 22.

The camera block 21 includes one or more units of cameras; for example, the camera block 21 takes images from the own vehicle in a travel direction of the own vehicle. The camera block 21 supplies an image obtained by the imaging to the information processing block 22.

It should be noted that the following description is done by use of an example in which the camera block 21 includes two units of cameras, one camera taking an image in the vehicle travel direction from the left side of the vehicle and the other camera taking an image in the vehicle travel direction from the right side of the vehicle. Further, in what follows, an image taken in the vehicle travel direction from the left side is referred to as a left-side image and an image taken in the vehicle travel direction from the right side is referred to as a right-side image.

The information processing block 22 is configured by including an image input block 31, a recognition block 32, an own-location confidence computation block 33, a vehicle recognition block 34, a relative-location confidence computation block 35, a communication block 39, an own-location computation block 36, an output control block 37, a storage block 38, and a communication block 39.

The image input block 31 gets a left-side image and a right-side image from the camera block 21 and supplies these images to the recognition block 32 and the vehicle recognition block 34.

The recognition block 32 recognizes an own location (hereafter referred to as a solely recognized own location), an attitude, a travel amount, and a speed on the basis of the left-side image and the right-side image by use of SLAM technology. The recognition block 32 supplies recognition results to the own-location confidence computation block 33, transmits the recognition results to the outside via the communication block 39, and outputs the recognition results to a subsequent stage of the information processing block 22. Further, the recognition block 32 supplies feature point information associated with the feature points detected from an image in the recognition processing to the own-location confidence computation block 33.

In addition, the recognition block 32 receives a global map for use in SLAM processing from a server not depicted and transmits a generated local map thereto via the communication block 39.

Here, a global map is a map indicative of a location in a three-dimensional space of a stationary object within a predetermined wide region. For example, a global map includes information indicative of information about a location in a three-dimensional space coordinate system and a feature amount of feature points of a stationary object within a predetermined region. It should be noted that a space coordinate system is expressed by latitude, longitude, and height from ground.

A local map is a map indicative of a location in a three-dimensional space of a stationary object around the own vehicle. For example, as with a global map, a local map includes information about a location in a three-dimensional space system and a feature amount of feature points of a stationary object around each moving body.

The own-location confidence computation block 33 computes the confidence indicative of the reliability of a solely recognized own location recognized by the recognition block 32. The own-location confidence computation block 33 supplies the computed solely recognized own location and the confidence thereof to the own-location computation block 36 and the output control block 37.

The vehicle recognition block 34 executes the recognition of a vehicle around the own vehicle and the recognition of a relative location of a vehicle around the own vehicle relative thereto on the basis of a left-side image and a right-side image. The vehicle recognition block 34 supplies the relative location and vehicle information (to be described later) of the recognized surrounding vehicle, the left-side image and the right-side image, and detection results of the feature points in the left-side image and the right-side image to the relative-location confidence computation block 35. In addition, if the recognition of relative location of a surrounding vehicle fails, the vehicle recognition block 34 notifies the own-location computation block 36 of the failure of the recognition.

The vehicle recognition block 34 transmits a location recognition enquiry signal for enquiring the success or failure in the recognition of an absolute location to the surroundings via the communication block 39 and receives a response signal from a vehicle recognizing the absolute location.

The response signal includes identification information for identifying a vehicle from which the response signal has been transmitted and vehicle information including the contact information of this vehicle. The identification information includes the contents (numbers, characters, geographical name), for example, of the number plates of the vehicle. The contact information is used for direction communication with the vehicle and includes an address and so on, for example, allocated to each vehicle.

The relative-location confidence computation block 35 computes the confidence indicative of the reliability of a relative location of a surrounding vehicle recognized by the vehicle recognition block 34. The relative-location confidence computation block 35 supplies the relative location of the surrounding vehicle and the confidence thereof and the vehicle information of the surrounding vehicle to the own-location computation block 36.

The own-location computation block 36 transmits a location enquiry signal for enquiring a surrounding vehicle for an absolute location and receives a response signal therefrom via the communication block 39. This response signal includes the absolute location of the surrounding vehicle and the confidence thereof and the vehicle information, for example.

In addition, the own-location computation block 36 computes an own location (hereafter referred to as a jointly recognized own location) and the confidence thereof on the basis of a solely recognized own location, an absolute location of a surrounding vehicle, a relative location of the surrounding vehicle, and the confidence thereof. Further, the own-location computation block 36 computes an own location (hereafter referred to as a composite own location) and the confidence thereof on the basis of a solely recognized own location, a jointly recognized own location, and the confidence thereof. The own-location computation block 36 supplies the jointly recognized own location, the composite own location, and the confidence thereof to the output control block 37. In addition, if the computation of an own location fails, the own-location computation block 36 notifies the output control block 37 of the failure of the computation.

Further, the own-location computation block 36 sets a vehicle subject to the computation of jointly recognized own location to a vehicle subject to tracking and supplies the vehicle information about the vehicle subject to tracking to the vehicle recognition block 34. A vehicle subject to tracking denotes a vehicle of which relative location is continuously recognized so as to obtain an absolute location of the vehicle.

The output control block 37 controls outputting of an absolute location (namely, an own location) of the own vehicle to a subsequent stage. In addition, the output control block 37 stores the most recent own location and the confidence thereof into the storage block 38. Further, the output control block 37 instructs the own-location computation block 36 for the computation of an own location.

Still further, if the output control block 37 receives a location recognition enquiry signal or a location enquiry signal from another information processing system 11 via the communication block 39, the output control block 37 transmits a response signal to the enquiring information processing system 11 as required.

The communication block 39 executes communication with another information processing system 11, a server, and so on not depicted, thereby sending and receiving various kinds of information and data. The communication block 39 supplies the received information and data to each component of the information processing block 22.

It should be noted that, for the convenience of description, when the information processing system 11 executes communication with another information processing system 11 arranged on another vehicle, the description of another information processing system 11 is sometimes omitted; instead, it is sometimes described that the information processing system 11 executes communication and so on with another vehicle.

{Exemplary Configuration of the Recognition Block 32}

Figure 2:
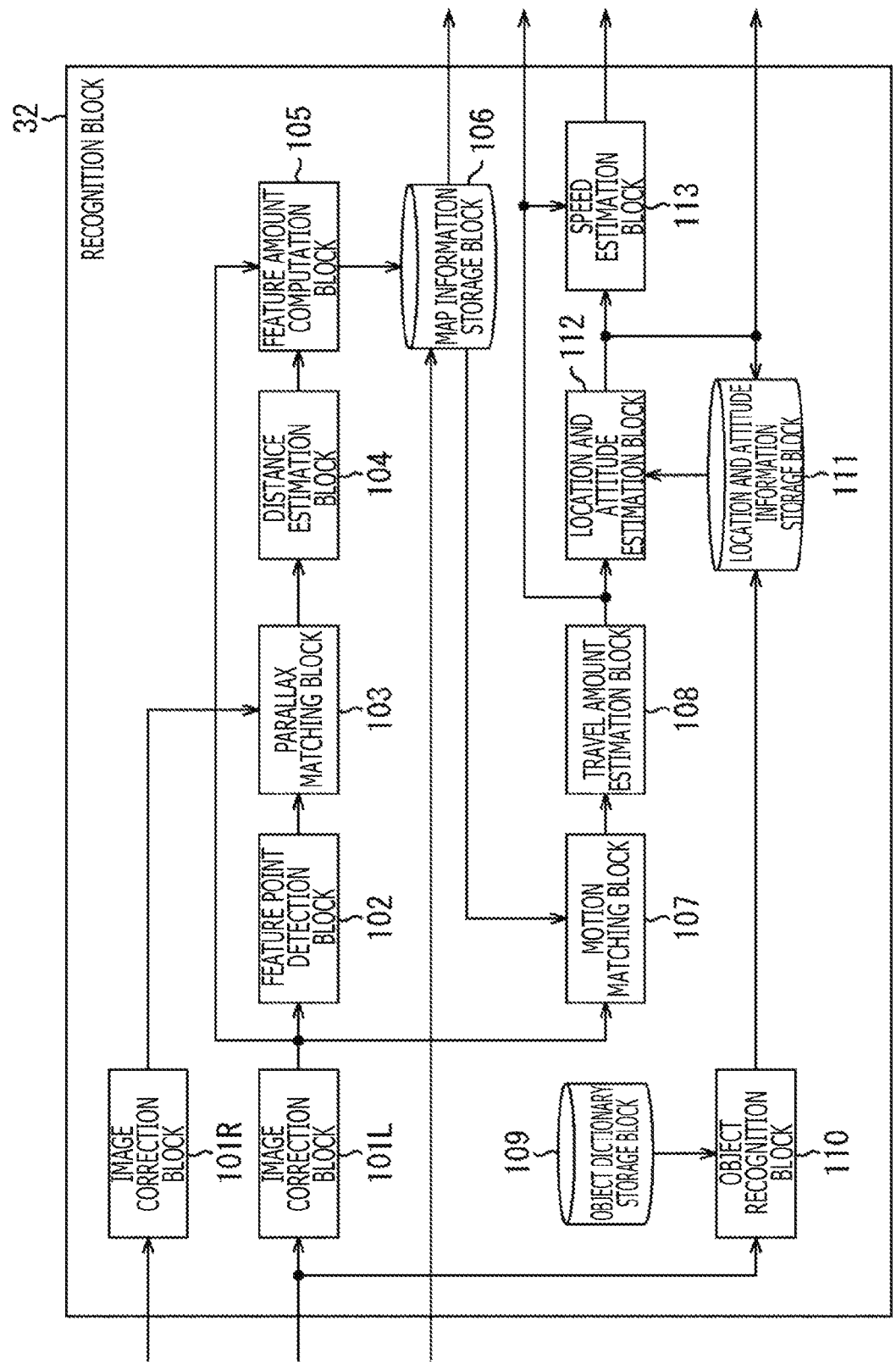
FIG. 2 is a block diagram illustrating an exemplary configuration of a recognition block.

FIG. 2 depicts a block diagram illustrating an exemplary configuration of the recognition block 32. The recognition block 32 is configured by including image correction blocks 101L and 101R, a feature point detection block 102, a parallax matching block 103, a distance estimation block 104, a feature amount computation block 105, a map information storage block 106, a motion matching block 107, a travel amount estimation block 108, an object dictionary storage block 109, an object recognition block 110, a location and attitude information storage block 111, a location and attitude estimation block 112, and a speed estimation block 113.

The image correction block 101s L and R correct a left-side image and a right-side image supplied from the camera block 21 into the images that are directed in a same direction. The image correction block 101L supplies the corrected left-side image to the feature point detection block 102 and the motion matching block 107. The image correction block 101R supplies the corrected right-side image to the parallax matching block 103.

The feature point detection block 102 detects the feature points of a left-side image. The feature point detection block 102 supplies the two-dimensional locational information indicative of a location in a two-dimensional image coordinate system of each detected feature point to the parallax matching block 103 and the feature amount computation block 105. It should be noted that the image coordinate system is expressed by the x coordinate and the y coordinate in an image, for example.

The parallax matching block 103 detects the feature point of a right-side image corresponding to the feature point detected in a left-side image. Consequently, a parallax that is a difference between the locations of the feature points in the left-side image and the right-side image is obtained. The parallax matching block 103 supplies the two-dimensional locational information indicative of the locations in the image coordinate system of the feature points in the left-image and the right image to the distance estimation block 104.

The distance estimation block 104 estimates a distance to each feature point on the basis of the parallax between the feature points in the left-side image and the right-side image and then computes the location of each feature point in the three-dimensional coordinate system. The distance estimation block 104 supplies the three-dimensional positional information indicative of the location in the space coordinate system of each feature point to the feature amount computation block 105.

The feature amount computation block 105 computes a feature amount of each feature point of the left-side image. The feature amount computation block 105 stores the feature point information including the three-dimensional positional information and the feature amount of each feature point into the map information storage block 106. This feature point information is used for the generation of a local map and the computation of the confidence in a solely recognized own location, for example.

The map information storage block 106 also stores a global map supplied from a server not depicted, in addition to the feature point information.

The motion matching block 107 obtains the three-dimensional locational information of each feature point detected in one frame immediately in front of a current frame from the map information storage block 106. Next, in the left-side image of the current frame, the motion matching block 107 detects the feature point corresponding to each feature point detected in one frame immediately in front of the current. Then, the motion matching block 107 supplies the three-dimensional locational information of each feature point in one frame immediately in front of the current frame and the two-dimensional locational information indicative of a location in the image coordinate system in the current frame to the travel amount estimation block 108.

On the basis of the three-dimensional locational information of each feature point in one frame immediately in front of the current frame and the two-dimensional locational information of the current frame, the travel amount estimation block 108 estimates the travel amounts of the location and the attitude of the own vehicle between the frames. The travel amount estimation block 108 supplies the travel amount information indicative of the estimated travel amounts of the location and attitude of the own vehicle to the own-location confidence computation block 33, the communication block 39, the location and attitude estimation block 112, the speed estimation block 113, and the information processing block 22 as required.

The object recognition block 110 recognizes an object in a left-side image on the basis of an object dictionary stored in the object dictionary storage block 109. On the basis of object recognition results, the object recognition block 110 sets the initial values (hereafter referred to as an initial location and an initial attitude) of an absolute location and an attitude in the space coordinate system of the own vehicle. The object recognition block 110 stores the initial location and attitude information indicative of the set initial location and initial attitude into the location and attitude information storage block 111.

The location and attitude estimation block 112 estimates the absolute location (the own location) and the attitude of the own vehicle on the basis of the initial location and attitude information or the location and attitude information of one frame immediately in front of the current frame stored in the location and attitude information storage block 111 and the own vehicle travel amount estimation results. In addition, the location and attitude estimation block 112 corrects the estimated own location and attitude on the basis of the global map stored in the map information storage block 106, as required. The location and attitude estimation block 112 supplies the location and attitude information indicative of the estimated own location (the solely recognized own location) and attitude to the communication block 39, the speed estimation block 113, and the subsequent stage of the information processing block 22, as required. Further, the location and attitude estimation block 112 stores the location and attitude information into the location and attitude information storage block 111. Still further, the location and attitude estimation block 112 supplies the positional information indicative of the estimated own location (the solely recognized own location) to the own-location confidence computation block 33.

The speed estimation block 113 estimates a speed of the own vehicle by dividing the estimated travel amount of the own vehicle by an elapsed time. The speed estimation block 113 supplies the speed information indicative of the estimated speed to the communication block 39 and the subsequent stage of the information processing block 22, as required.

{Processing of the Information Processing System 11}

The following describes the processing of the information processing system 11 with reference to FIG. 3 through FIG. 7.

(First Embodiment of Own Location Recognition Processing)

To begin with, the first embodiment of the own location recognition processing to be executed by the information processing system 11 is described with reference to the flowcharts depicted in FIG. 3 and FIG. 4.

In step S1, the camera block 21 starts taking images. The camera block 21 supplies a left-side image and a right-side image obtained as a result of the imaging to the image input block 31. The image input block 31 supplies the left-side image to the image correction block 101L of the recognition block 32 and the right-side image to the image correction block 101R of the recognition block 32. In addition, the image input block 31 supplies the left-side image and the right-side image to the vehicle recognition block 34.

In step S2, the recognition block 32 recognizes the own location on the basis of the obtained images.

To be more specific, the image correction block 101L and the image correction block 101R correct the left-side image and the right-side image, respectively, to the images that are directed in the same direction. The image correction block 101L supplies the corrected left-side image to the feature point detection block 102 and the motion matching block 107. The image correction block 101R supplies the corrected right-side image to the parallax matching block 103.

The feature point detection block 102 detects the feature points of the left-side image. For the feature point detection method, any one of methods such as Harris Corner detection, for example, may be used. The feature point detection block 102 supplies the two-dimensional locational information indicative of a location of each detected feature point in the image coordinate system to the parallax matching block 103.

The parallax matching block 103 detects the feature point of the right-side image corresponding to the feature point detected in the left-side image. The parallax matching block 103 supplies the two-dimensional locational information indicative of the location of each feature point in the left-side image and the right-side image in the image coordinate system to the distance estimation block 104.

The distance estimation block 104 estimates a distance up to each feature point on the basis of the parallax between the left-side image and the right-side image of the feature points and computes a location of each feature point in the three-dimensional coordinate system. The distance estimation block 104 supplies the three-dimensional locational information indicative of the location of each feature point in the space coordinate system to the feature amount computation block 105.

The feature amount computation block 105 computes a feature amount of each feature point in the left-side image. For a feature amount, any one of feature mounts such as SURF (Speeded Up Robust Features), for example, may be used. The feature amount computation block 105 stores the feature point information including the three-dimensional locational information and the feature amount of each feature point into the map information storage block 106.

The motion matching block 107 obtains the three-dimensional locational information of each feature point detected in one frame immediately in front of the current frame from the map information storage block 106. Next, in the left-side image of the current frame, the motion matching block 107 detects a feature point corresponding to each feature point detected in one frame immediately in front of the current frame. Then, the motion matching block 107 supplies the three-dimensional locational information of each feature point in one frame immediately in front of the current frame and the two-dimensional locational information indicative of the location in the current frame in the image coordinate system to the travel amount estimation block 108.

The travel amount estimation block 108 estimates a travel amount of the own vehicle (to be more correct, the camera of the camera block 21) between the one frame immediately in front of the current frame and the current frame. For example, the travel amount estimation block 108 computes travel amount dX that minimizes the value of cost function f of equation (1) below.

$$f = \Sigma \|Z_t - \text{proj}(dX, M_{t-1})\|^2 \qquad (1)$$

It should be noted that travel amount dX is indicative of a travel amount in the location and attitude of the own vehicle (to be more correct, a camera 201L) from one frame immediately in front of the current frame to the current frame. For example, travel amount dX is indicative of travel amounts of a location along three axes (3 freedom degrees) in the space coordinate system and an attitude around each axis (3 freedom degrees).

$M_{t-1}$ and $Z_t$ are indicative of locations of one frame immediately in front of the current frame and the current frame of the corresponding feature points. To be more specific, $M_{t-1}$ is indicative of the location of a feature point in one frame immediately in front of the current frame in the space coordinate system and $Z_t$ is indicative of the location of the feature point of the in the current frame in the image coordinate system.

Further, $\text{proj}(dX, M_{t-1})$ is indicative of a location obtained by projecting location $M_{t-1}$ of the feature point in the space coordinate system in one frame immediately in front of the current frame onto the image coordinate system of the left-side image of the current image by use of travel amount dX. That is, $\text{proj}(dX, M_{t-1})$ is the estimation of the location of the feature point in the left-side image of the current frame on the basis of location $M_{t-1}$ and travel amount dX of the feature point in one frame immediately in front of the current frame.

The travel amount estimation block 108 obtains, through the least squares method, for example, travel amount dX that minimizes a sum of squares of $Z_t - \text{proj}(dX, M_{t-1})$ of each feature point indicated in equation (1) above. That is, on the basis of location Mt−1 and travel amount dX of each feature point in the space coordinate system in one frame immediately in front of the current frame, the travel amount estimation block 108 obtains travel amount dX that minimizes an error when a location of the feature point in the image coordinate system of the left-side image of the current frame is estimated. The travel amount estimation block 108 supplies the travel amount information indicative of obtained travel amount dX to the own-location confidence computation block 33, the communication block 39, the location and attitude estimation block 112, the speed estimation block 113, and the subsequent stage of the information processing block 22, as required.

The location and attitude estimation block 112 obtains the location and attitude information in one frame immediately in front of the current frame from the location and attitude information storage block 111. Then, the location and attitude estimation block 112 estimates the current absolute location (the own location) and attitude of the own vehicle by adding travel amount dX estimated by the travel amount estimation block 108 to the location and attitude of the own vehicle in one frame immediately in front of the current frame.

It should be noted that, in estimating the location and attitude of the own vehicle in the first frame, the location and attitude estimation block 112 obtains the initial location and attitude information from the location and attitude information storage block 111. Then, the location and attitude estimation block 112 estimates the own location and attitude by adding travel amount dX estimated by the travel amount estimation block 108 to the initial location and the initial attitude of the own vehicle.

Further, the location and attitude estimation block 112 corrects the estimated own location and attitude of the own vehicle on the basis of the global map stored in the map information storage block 106.

The location and attitude estimation block 112 supplies the location and attitude information indicative of the estimated own location (the solely recognized own location) and attitude of the own vehicle to the communication block 39, the speed estimation block 113, and the subsequent stage of the information processing block 22, as required. In addition, the location and attitude estimation block 112 stores the location and attitude information into the location and attitude information storage block 111. Further, the location and attitude estimation block 112 supplies the location and attitude information indicative of the estimated own location (the solely recognized own location) to the own-location confidence computation block 33.

In step S3, the own-location confidence computation block 33 computes the confidence in the solely recognized own location (the solely recognized own location).

For example, on the basis of the ratio in which a moving body occupies an image used for the recognition of own location, the own-location confidence computation block 33 computes the confidence in own location. To be more specific, the own-location confidence computation block 33 obtains the feature point information of one frame immediately in front of the current frame and the current frame from the map information storage block 106. Next, the own-location confidence computation block 33 matches the feature point of one frame immediately in front of the current frame with the feature point of the current frame so as to detect the motion of each feature between these frames. Then, the own-location confidence computation block 33 makes distinction between the feature point that is moving correspondingly with the motion of the own vehicle obtained by travel amount dX estimated by the travel amount estimation block 108 and the feature point that is not moving correspondingly with the motion of the own vehicle. Next, on the basis of the feature point moving correspondingly with the motion of the own vehicle, the own-location confidence computation block 33 detects a stationary object around the own vehicle. In addition, on the basis of the feature point that is not moving correspondingly with the motion of the own vehicle, the own-location confidence computation block 33 detects a moving body around the own vehicle.

Then, on the basis of the ratio in which the area of the detected moving body occupies the image, computes the confidence. For example, as the ratio in which the area of the detected moving body occupies the image increases, the own-location confidence computation block 33 lowers the confidence and, as the ratio in which the area of the detected moving body occupies the image decreases, the own-location confidence computation block 33 raises the confidence. This is because, in SLAM, own location is recognized on the basis of a relative location between the feature point of a stationary object in the image and the own vehicle, so that, if the area of the moving body in the image increases so as to decrease the feature points of the stationary object, the accuracy in the recognition of own location lowers.

The own-location confidence computation block 33 supplies the solely recognized own location and the confidence thereof to the output control block 37.

In step S4, the output control block 37 determines whether the confidence in the solely recognized own location (the solely recognized own location) is equal to or higher than a predetermined threshold value. If the confidence in the solely recognized own location is found to be equal to or higher than the predetermined threshold value, then the processing go to step S5.

In step S5, the output control block 37 outputs the solely recognized own location (the solely recognized own location) to the subsequent stage. In addition, the output control block 37 stores the solely recognized own location and the confidence thereof to the storage block 38 as the most recent own location and confidence thereof.

Then, the processing returns to step S2 to repeat the above-mentioned processing operations from step S2.

On the other hand, in step S4, if the confidence in the solely recognized own location is found to be lower than the predetermined threshold value, then the processing goes to step S6.

In step S6, the own-location computation block 36 determines whether there is any vehicle being tracked. To be more specific, the output control block 37 instructs the own-location computation block 36 to compute a jointly recognized own location. If a vehicle being tracked is set in the processing to step S19 to be described later in the loop of the last own location recognition processing, the own-location computation block 36 determines that there is a vehicle being tracked, upon which the processing goes to step S7.

In step S7, the vehicle recognition block 34 recognizes a relative location of the vehicle being tracked. To be more specific, the own-location computation block 36 instructs the vehicle recognition block 34 to recognize a relative position of the vehicle being tracked. The vehicle recognition block 34 detects the feature points in the left-side image and the right-side image. Next, on the basis of the feature points of the vehicle being tracked detected in the last recognition processing, the vehicle recognition block 34 recognizes the vehicle being tracked in the left-side image and the right-side image. If the recognition of the vehicle being tracked is successful, then the vehicle recognition block 34 recognizes the relative location of the vehicle being tracked relative to the own vehicle.

It should be noted that any one of tracking methods may be used for the method of tracking vehicles. For example, a method of tracking the back surface of each vehicle by use of an object recognition technique or Homography Tracking by learning the back surface of each vehicle as a planar object.

Further, for the method of recognizing the relative location with a vehicle being tracked, any one of methods may be used.

In step S8, the vehicle recognition block 34 determines whether the relative location could be recognized. If the recognition of the relative location is found successful, then the processing goes to step S9.

In step S9, the relative-location confidence computation block 35 computes the confidence in the relative location. To be more specific, the vehicle recognition block 34 supplies the detection results of the relative location of the vehicle being tracked, the left-side image and the right-side image, the feature points in the left-side image and the right-side image, and the vehicle information about the vehicle being tracked to the relative-location confidence computation block 35.

The relative-location confidence computation block 35 computes the confidence in the relative location of the vehicle being tracked. For a method of computing the confidence in the relative location, any one of methods may be used.

For example, on the basis of the blur of the left-side image and the right-side image, the relative-location confidence computation block 35 can compute the confidence in the relative location. For example, as the blur of the left-side image and the right-side image gets smaller, the relative-location confidence computation block 35 increases the confidence and, as the blur of the left-side image and the right-side image gets greater, the relative-location confidence computation block 35 lowers the confidence.

In addition, on the basis of the number of feature points used for the recognition of a vehicle being tracked, the relative-location confidence computation block 35 can compute the confidence, for example. For example, as the number of feature points increases, the relative-location confidence computation block 35 raises the confidence and, as the number of feature points decreases, the relative-location confidence computation block 35 lowers the confidence.

The relative-location confidence computation block 35 supplies the relative location of the vehicle being tracked and the confidence thereof and the vehicle information about the vehicle being tracked to the own-location computation block 36.

In step S10, the information processing block 22 enquires the vehicle being tracked for the absolute location. To be more specific, the own-location computation block 36 generates a location enquiry signal for enquiring the vehicle being tracked for the absolute location and supplies the generated signal to the communication block 39. The communication block 39 transmits the location enquiry signal to the vehicle being tracked (the information processing system 11 thereof).

In step S11, the own-location computation block 36 determines whether the acquisition of the absolute location of the vehicle being tracked is successful or not. If a response signal including the absolute location could not be received from the vehicle being tracked (the information processing system 11 thereof), the own-location computation block 36 determines that the acquisition of the absolute location of the vehicle being tracked is unsuccessful, upon which the processing goes to step S12.

On the other hand, if the relative location of the vehicle being tracked is found not recognized in step S8, the processing operations in step S9 through S11 are skipped and the processing goes to step S12. At this moment, the vehicle recognition block 34 notifies the own-location computation block 36 of the failure of the recognition of the relative location of the vehicle being tracked.

If the vehicle being tracked is not found in step S6, then the processing operations of steps S7 through S11 are skipped and the processing goes to step S12.

In step S12, the information processing block 22 searches for the vehicle that recognizes the absolute location. To be more specific, the own-location computation block 36 instructs the vehicle recognition block 34 to recognize the relative location of the vehicle (hereafter referred to as a location recognizing vehicle) that recognizes the absolute location of the surroundings. The vehicle recognition block 34 generates a location recognition enquiry signal for enquiring whether the recognition of the absolute location is successful or not and supplies the generated signal to the communication block 39. The communication block 39 transmits the location recognition enquiry signal to the surroundings of the own vehicle.

In the S13, the vehicle recognition block 34 determines whether the vehicle (the location recognizing vehicle) recognizing the absolute location has been found or not. To be more specific, if a response signal for a location enquiry signal from another vehicle comes via the communication block 39, the vehicle recognition block 34 determines that the location recognizing vehicle has been found, upon which the processing goes to step S14.

It should be noted that the response signal includes the vehicle information of the vehicle from which the response signal comes, for example.

In step S14, the vehicle recognition block 34 recognizes the relative location of the vehicle recognizing the absolute location. For example, the vehicle recognition block 34 recognizes the feature points in the left-side image and the right-side image. Next, on the basis of the detected feature points, the vehicle recognition block 34 recognizes vehicles in the left-side image and the right-side image. If the recognition of vehicles in the left-side image and the right-side image is successful, then the vehicle recognition block 34 identifies the location recognizing vehicle from among the recognized vehicles by use of the identification information included in the vehicle information of the location recognizing vehicle. For example, if the contents of number plates are included in the identification information, then the vehicle recognition block 34 identifies, from among the vehicles recognized from the left-side image and the right-side image, the vehicle having the number plate matching the identification information as the location recognizing vehicle. If the identification of the location recognizing vehicle is successful, then the vehicle recognition block 34 recognizes the relation location of the location recognizing vehicle relative to the own vehicle.

It should be noted that any one of methods may be used for a method of recognizing the location recognizing vehicle and the relative location thereof. For example, the same method as the processing of step S7 may be used.

In step S15, the vehicle recognition block 34 determines whether the recognition of the relative location is successful or not. If the recognition of the relative location is found to be successful, then the processing goes to step S16.

In step S16, the relative-location confidence computation block 35 computes the confidence in the relative location. To be more specific, the vehicle recognition block 34 supplies the relative location of the location recognizing vehicle, the left-side image and the right-side image, the detection results of the feature points in the left-side image and the right-side image, and the vehicle information of the location recognizing vehicle to the relative-location confidence computation block 35.

By the same method as the processing of step S9, the relative-location confidence computation block 35 computes the confidence in the relative location of the location recognizing vehicle. The relative-location confidence computation block 35 supplies the relative location of the location recognizing vehicle and the confidence thereof and the vehicle information of the location recognizing vehicle to the own-location computation block 36.

In step S17, the information processing block 22 enquires the vehicle that has recognized the relative location for the absolute location. To be more specific, the own-location computation block 36 generates a location enquiry signal for enquiring the vehicle that has recognized the relative location for the absolute location and supplies the generated signal to the communication block 39. The communication block 39 transmits the location enquiry signal to the vehicle (the information processing system 11 thereof) that has recognized the relative location.

In step S18, the own-location computation block 36 determines whether the acquisition of the absolute location of the enquired vehicle is successful or not. If the reception of a response signal including the absolute location from the vehicle enquired vehicle is found successful via the communication block 39, then the own-location computation block 36 determines that the acquisition of the absolute location of the enquired vehicle is successful, upon which the processing goes to step S19.

It should be noted that the response signal includes the absolute location and the confidence thereof of the enquiring vehicle and the vehicle information thereof, for example.

On the other hand, in step S11, if the reception of the response signal including the absolute location from the vehicle being tracked via the communication block 39 is successful, then the own-location computation block 36 determines that the acquisition of the absolute location of the vehicle being tracked is successful, upon which the processing goes to step S19.

It should be noted that the response signal includes the absolute location and the confidence thereof of the vehicle being tracked and the vehicle information thereof, for example.

In step S19, on the basis of the absolute location of a surrounding vehicle and the relative location therewith, the own-location computation block 36 computes the own location. To be more specific, the own-location computation block 36 computes the own location by adding the relative location with a surrounding vehicle recognized by the vehicle recognition block 34 to the absolute location of the surrounding vehicle (the vehicle being tracked or the location recognizing vehicle). Thus, jointly with the surrounding vehicle, the own location (the jointly recognized own location) is recognized.

Further, on the basis of the absolute location and the confidence thereof of the surrounding vehicle and the confidence in the relative location with the surrounding vehicle, the own-location computation block 36 computes the confidence in the jointly recognized own location. For example, the own-location computation block 36 computes an average value of the confidence in the absolute location of the surrounding vehicle and the confidence in the relative location with the surrounding vehicle as the confidence in the jointly recognized own location. Alternatively, if the confidence is set in a range of 0% to 100%, then the own-location computation block 36 computes a product of the confidence in the absolute location of the surrounding vehicle and the confidence in the relative location with the surrounding vehicle as the confidence in the jointly recognized own location.

The own-location computation block 36 supplies the jointly recognized own location and the confidence thereof to the output control block 37. In addition, the own-location computation block 36 sets the surrounding vehicle with which to compute the jointly recognized own location as the vehicle being tracked and supplies the vehicle information of this vehicle being tracked to the vehicle recognition block 34.

In step S20, the output control block 37 determines whether the confidence in the own location (jointly recognized own location) recognized jointly with the surrounding vehicle is equal to or higher than a predetermined threshold value or not. If the confidence in the jointly recognized own location is found to be equal to or higher than the predetermined threshold value, then the processing go to step S21.

In step S21, the output control block 37 outputs the own location (the jointly recognized own location) recognized jointly with the surrounding vehicle to the subsequent stage. In addition, the output control block 37 stores the jointly recognized own location and the confidence thereof into the storage block 38 as the most recent own location and confidence thereof.

Then, the processing returns to step S2 to repeat the above-mentioned processing operations from step S2.

On the other hand, if the confidence in the jointly recognized own location is found to be lower than the predetermined threshold value in step S20, then the processing goes to step S22.

Further, in step S18, if the reception of a response signal including the absolute location from the enquired vehicle is unsuccessful, the own-location computation block 36 determines that the acquisition of the absolute location of the enquired vehicle is unsuccessful, upon which the processing goes to step S22. At this moment, the own-location computation block 36 notifies the output control block 37 of the failure of the computation of the own location.

Still further, in step S15, if the recognition of the relative location is found to be unsuccessful, then the processing goes to step S22. At this moment, the vehicle recognition block 34 notifies the own-location computation block 36 of the failure of the recognition of the relative location of the location recognizing vehicle. The own-location computation block 36 notifies the output control block 37 of the failure of the computation of the own location.

If the reception of a response signal to the location recognition enquiry signal from another vehicle is unsuccessful in step S13, then the vehicle recognition block 34 determines that no location recognizing vehicle has been found, upon which the processing goes to step S22. At this moment, the vehicle recognition block 34 notifies the own-location computation block 36 of the failure of the recognition of the relative location of the location recognizing vehicle. The own-location computation block 36 notifies the output control block 37 of the failure of the computation of the own location.

In step S22, the output control block 37 outputs an error signal indicative of the failure of the recognition of the own location to the subsequent stage. In addition, the output control block 37 deletes the own location and the confidence thereof from the storage block 38. Consequently, a state is entered in which the information processing system 11 does not recognize the own location of the own vehicle.

Then, the processing returns to step S2 to repeat the above-mentioned processing operations from step S2.

(Own Location Transmission Processing)

Figure 5:
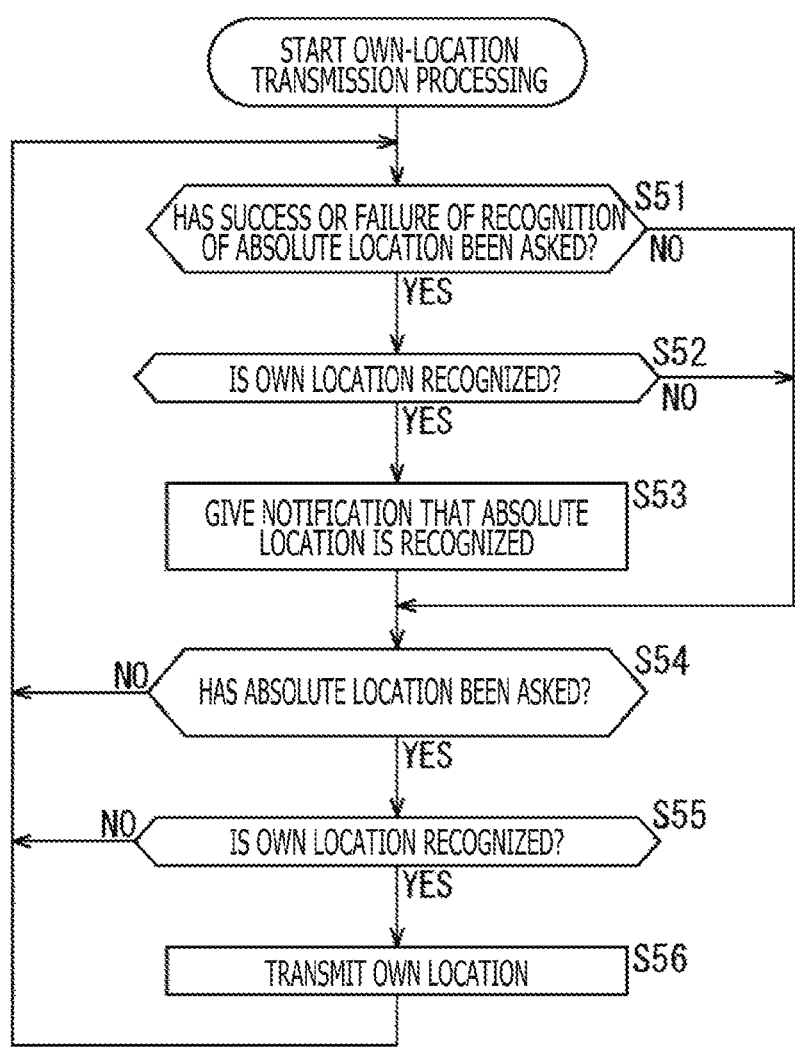
FIG. 5 is a flowchart for describing an own-location transmission processing.

The following describes the processing for the information processing system 11 to transmit the own location to a surrounding vehicle with reference to a flowchart depicted in FIG. 5.

In step S51, the communication block 39 determines whether there was an enquiry for the success or failure of the recognition of an absolute location. To be more specific, if a location recognition enquiry signal came from another information processing system 11 in step S11 depicted in FIG. 4, then the communication block 39 determines that there has been an enquiry for the success or failure of the recognition of the absolute location. Then, the processing goes to step S52.

In step S52, the output control block 37 determines whether the own location is recognized or not. To be more specific, the communication block 39 notifies the output control block 37 of a location recognition enquiry signal. If the own location is stored in the storage block 38, then the output control block 37 determines that the own location is recognized, upon which the processing goes to step S53.

In step S53, the information processing block 22 gives a notification that the absolute location is recognized. To be more specific, the output control block 37 generates a response signal including the vehicle information of the own vehicle and supplies the generated signal to the communication block 39. The communication block 39 transmits the response signal to the enquiring information processing system 11.

Subsequently, the processing goes to step S54.

On the other hand, if there is no enquiry for the success or failure of the recognition of the own location in step S51 or if the own location is found not to have been recognized in step S52, the processing goes to step S54.

In step S54, the communication block 39 determines whether there has been an enquiry for the absolute location or not. To be more specific, if a location enquiry signal transmitted from another information processing system 11 has been received in step S10 depicted in FIG. 3 or step S17 depicted in FIG. 4, the communication block 39 determines that there has been an absolute location enquiry. Then, the processing goes to step S55.

In step S55, the output control block 37 determines whether the own location is recognized or not. To be more specific, the communication block 39 supplies a location enquiry signal to the output control block 37. If the own location is stored in the storage block 38, the output control block 37 determines that the own location is recognized, upon which the processing goes to step S56.

In step S56, the information processing block 22 transmits the own location. To be more specific, the output control block 37 obtains the own location and the confidence thereof from the storage block 38 and generates a response signal including the own location and the confidence thereof and the vehicle information of the own vehicle, supplying the generated signal to the communication block 39. The communication block 39 transmits the response signal to the enquiring information processing system 11.

Then, the processing returns to step S51 to repeat the above-mentioned processing operations from step S51.

On the other hand, if no absolute location enquiry is found in step S54 or if the own location is not found recognized in step S55, then the processing returns to step S51 to repeat the above-mentioned processing operations from step S51.

As described above, the accuracy in the recognition of own locations is enhanced by not only the sole recognition of own location by each vehicle (the information processing system 11) but also the joint recognition of own location with another vehicle (another information processing system 11).

Figure 6:
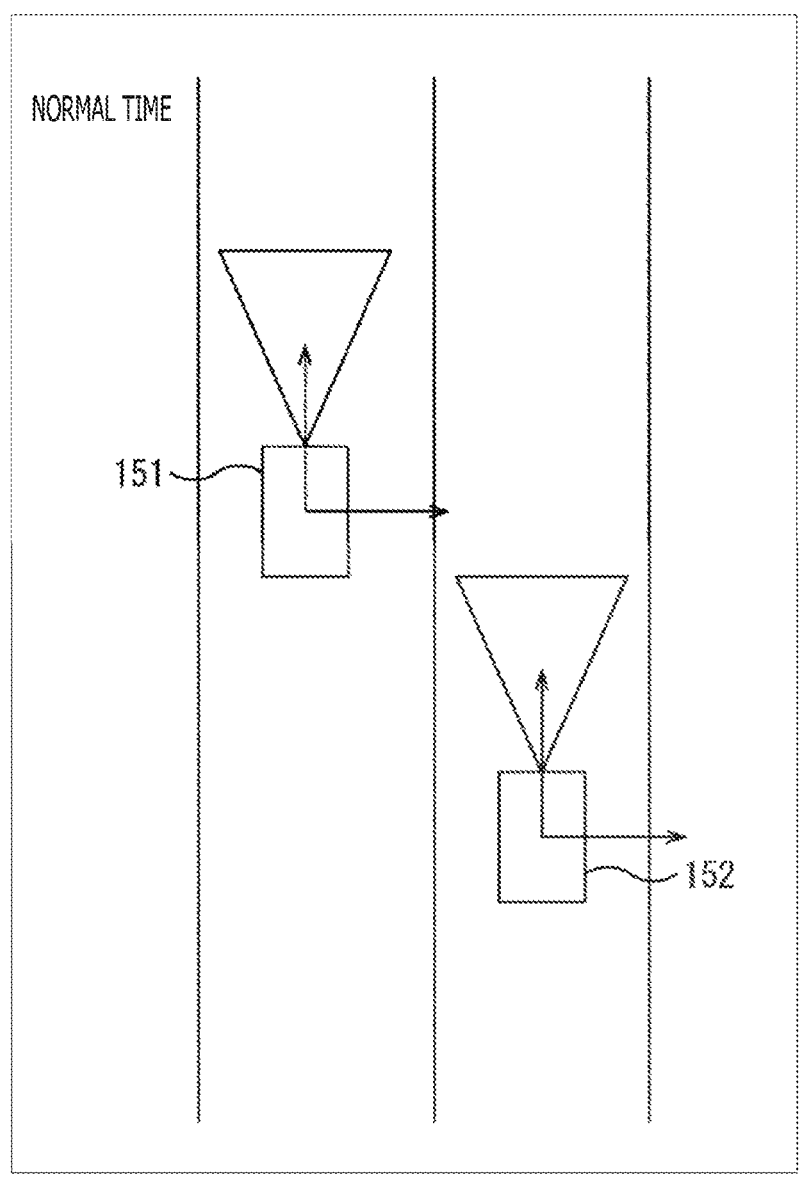
FIG. 6 is a diagram illustrating a specific example of an own-location recognition method.

For example, as depicted in FIG. 6, if a vehicle 151 is traveling on a road not congested, the field of vision in the traveling direction of the vehicle 151 is open. Therefore, in the left-side image and the right-side image taken from the vehicle 151, the ratio in which surroundings (a stationary object) on the basis of which the own location is recognized increases. As a result, the information processing system 11 of the vehicle 151 can solely recognize the own location with enhanced accuracy. This holds true with a vehicle 152.

Figure 7:
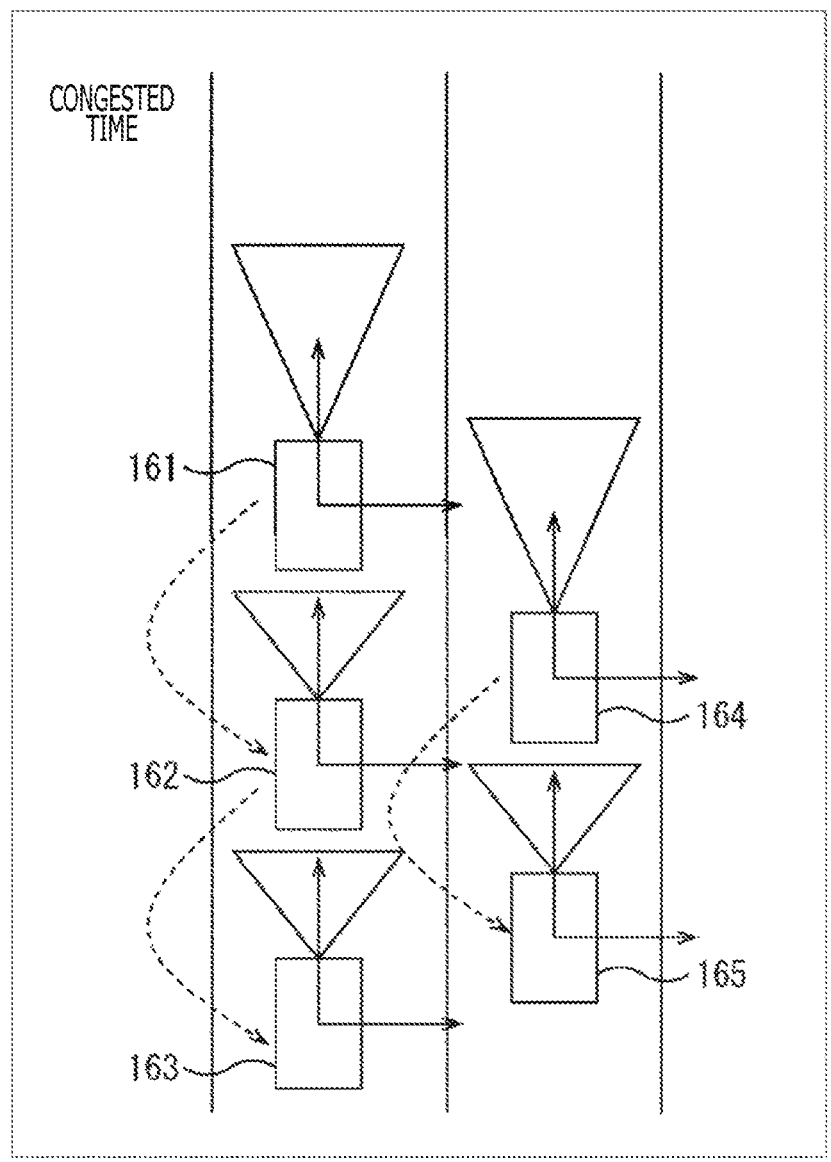
FIG. 7 is a diagram illustrating a specific example of the own-location recognition method.

On the other hand, if vehicle 161 through vehicle 165 are traveling on a congested road as depicted in FIG. 7, the vehicle 161 and vehicle 164 traveling ahead in each lane are open in the field of vision in the traveling direction. Therefore, the information processing systems 11 of the vehicle 161 and the vehicle 164 can solely recognize the own locations with enhanced accuracy as with the case of vehicle 151 and the vehicle 152 depicted in FIG. 6.

However, in the case of the vehicle 162, the vehicle 163, and the vehicle 165, there are other vehicles in the traveling direction, so that the field of vision is closed. Therefore, the ratio in which the surroundings (stationary objects) on the basis of which the own locations are recognized decreases in the left-side images and the right-side images taken from the vehicle 162, the vehicle 163, and the vehicle 165. Hence, it is possible for the accuracy in the own location solely recognized by the information processing systems 11 of the vehicle 162, the vehicle 163, and the vehicle 165 to be lowered.

By contrast, the information processing system 11 of the vehicle 162 can obtain the absolute location of enhanced accuracy of the vehicle 161 as described above, recognize the relative location with the vehicle 161, and, on the basis of the absolute location of the vehicle 161 and the relative location therewith, recognize the own location with enhanced accuracy. Likewise, the information processing system 11 of the vehicle 165 can also obtain the absolute location with enhanced accuracy of the vehicle 164, recognize the relative location with the vehicle 164, and, on the basis of the absolute location of the vehicle 164 and the relative location therewith, recognize the own location with enhanced accuracy.

In addition, the information processing system 11 of the vehicle 163 can obtain the absolute location jointly recognized with the vehicle 161 from the vehicle 162, recognize the relative location with the vehicle 162, and, on the basis of the absolute location of the vehicle 162 and the relative location therewith, recognize the own location with enhanced accuracy.

It should be noted that the information processing system 11 of one unit of vehicle may recognize two or more jointly recognized own locations with two or more surrounding vehicles. In this case, the jointly recognized own location having the highest confidence among the two or more jointly recognized own locations may be outputted, for example. Alternatively, an own location obtained by weight-adding two or more jointly recognized own locations in accordance with confidence may be outputted, for example.

2. Second Embodiment

Figure 8:
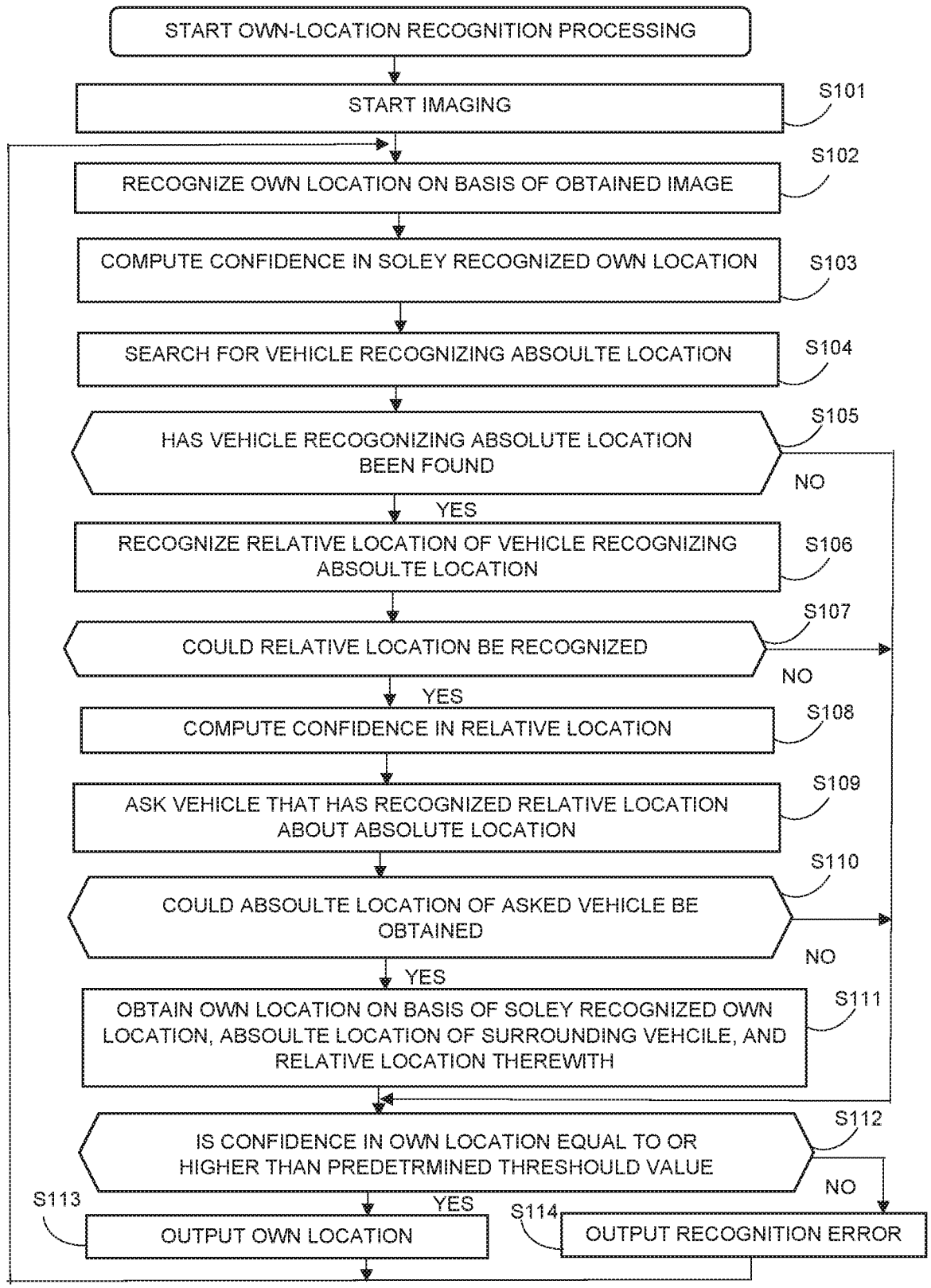
FIG. 8 is a flowchart for describing a second embodiment of the own-location recognition processing.

The following describes the second embodiment of the present technology with reference to FIG. 8. The second embodiment differs from the first embodiment in the method of own location recognition processing.

{The Second Embodiment of Own Location Recognition Processing}

The following describes the second embodiment of the own location recognition processing that is executed by the information processing system 11 with reference to a flowchart depicted in FIG. 8.

Figure 3:
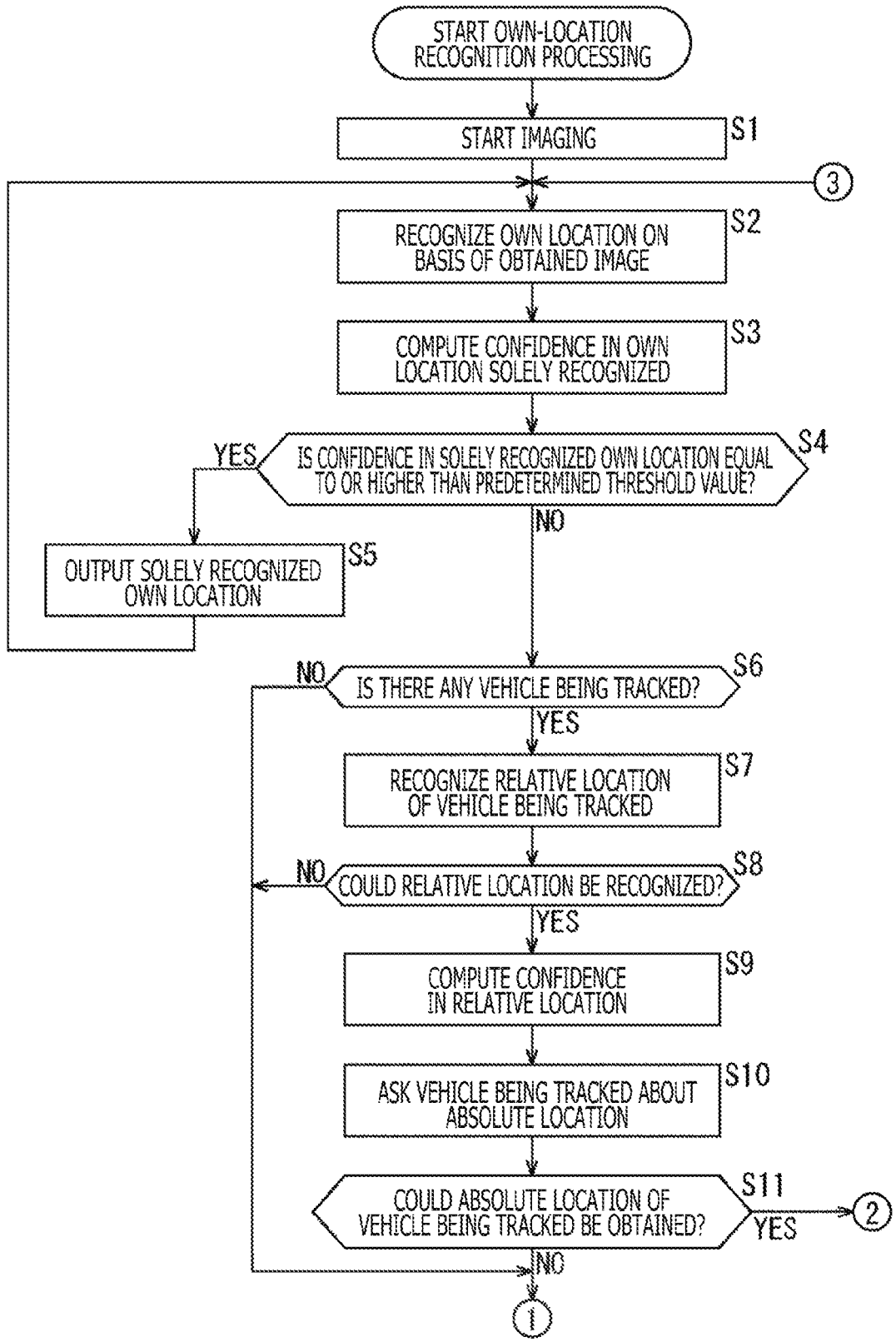
FIG. 3 is a flowchart for describing a first embodiment of an own-location recognition processing.

In step S101, imaging starts as with the processing of step S1 depicted in FIG. 3.

In step S102, an own location is recognized on the basis of obtained images as with the processing of step S2 depicted in FIG. 3.

In step S103, the confidence in a solely recognized own location (a solely recognized own location) is computed as with the processing of step S3 depicted in FIG. 3. The own-location confidence computation block 33 supplies the solely recognized own location and the confidence thereof to the own-location computation block 36 and the output control block 37.

Figure 4:
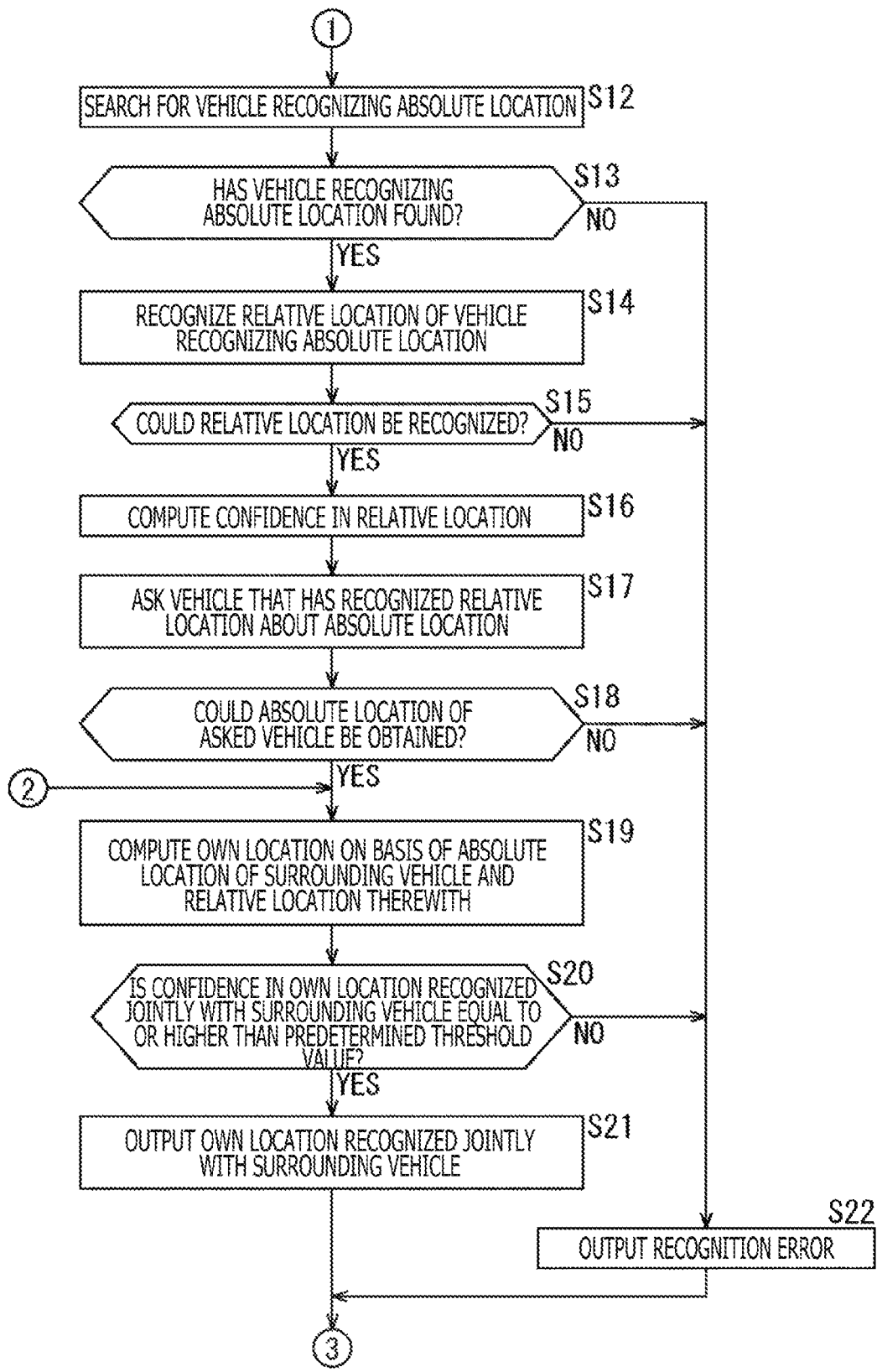
FIG. 4 is a flowchart for describing the first embodiment of the own-location recognition processing.

In step S104, a search for a vehicle recognizing the absolute location is done as with the processing of step S12 depicted in FIG. 4.

In step S105, it is determined whether a vehicle recognizing the absolute location has been found or not as with the processing of step S13 depicted in FIG. 4. If a vehicle recognizing the absolute location is found, the processing goes to step S106.

In step S106, the relative location of the vehicle recognizing the absolute location is recognized as with the processing of step S14 depicted in FIG. 4.

In step S107, it is determined whether the recognition of the relative location is successful or not as with the processing of step S15 depicted in FIG. 4. If the relative location is found to have been recognized, then the processing goes to step S108.

In step S108, the confidence in the relative location is computed as with the processing of step S16 depicted in FIG. 4.

In step S109, the surrounding vehicle recognizing the relative location is enquired for the absolute location as with the processing of step S17 depicted in FIG. 4.

In step S110, it is determines whether the acquisition of the absolute location from the enquired vehicle is successful or not as with the processing of step S18 depicted in FIG. 4. If the acquisition of the absolute location from the enquired vehicle is found successful, then the processing goes to step S111.

In step S111, the own-location computation block 36 obtains the own location on the basis of the solely recognized own location, the absolute location of the surrounding vehicle, and the relative location with the surrounding vehicle.

For example, on the basis of the absolute location of a surrounding vehicle and the relative location therewith, the own-location computation block 36 computes a jointly recognized own location as with the processing of step S19 depicted in FIG. 4. At this moment, two or more jointly recognized own locations may be computed on the basis of the absolute locations and relative locations of two or surrounding vehicles. In addition, as with the processing of step S19 depicted in FIG. 4, the own-location computation block 36 computes the confidence in the jointly recognized own location.

Then, the own-location computation block 36 computes a composite own location by weight-adding the solely recognized own location and the jointly recognized own location in accordance with the confidence, for example. Further, the own-location computation block 36 computes the confidence in the composite own location by also weight-adding the confidence.

It should be noted that, if two or more jointly recognized own locations have been computed, the solely recognized own locations and jointly recognized own locations except for those whose confidence is less than the predetermined threshold value may be weight-added, for example.

The own-location computation block 36 supplies the composite own location and the confidence thereof to the output control block 37.

Then, the processing goes to step S112.

On the other hand, if the vehicle recognizing the absolute location is determined not found in step S105, then, if the relative location is determined not found in step S107 or if the absolute location is determined not obtained from the enquired vehicle in step S117, then the composite own location is not computed, upon which the processing goes to step S112.

In step S112, the output control block 37 determines whether the confidence in the own location is equal to or higher than the predetermined threshold value or not. If the output control block 37 determines that at least one of the confidence in the solely recognized own location and the confidence in the composite own location is equal to or higher than the predetermined threshold value, then the processing goes to step S113.

In step S113, the output control block 37 outputs the own location. For example, the output control block 37 outputs the solely recognized own location or the composite own location, whichever is higher in confidence, to the subsequent stage. Alternatively, if the confidence of the composite own location is equal to or higher than the predetermined threshold value, the output control block 37 may preferentially output the composite own location to the subsequent stage regardless of the confidence in the solely recognized own location.

It should be noted that, if the composite own location has not been computed, the output control block 37 outputs the solely recognized own location to the subsequent stage.

In addition, the output control block 37 stores the outputted own location and the confidence thereof into the storage block 38 as the most recent own location and confidence thereof.

Subsequently, the processing returns to step S102 to repeat the above-mentioned processing operations from step S102.

On the other hand, if both the confidence in the solely recognized own location and the confidence in the composite own location are found to be less than the predetermined threshold value in step S112, then the processing goes to step S114. Alternatively, if the confidence in the solely recognized own location is found to be less than the predetermined threshold value with the composite own location not computed, then the processing goes to step S114.

In step S114, a recognition error is outputted was the processing of step S21 depicted in FIG. 4. In addition, the own location and the confidence thereof are deleted from the storage block 38.

Subsequently, the processing returns to step S102 to repeat the above-mentioned processing operations from step S102.

As described above, in the second embodiment, a final own location is obtained on the basis of both the solely recognized own location and the jointly recognized own location, sometimes enhancing the accuracy of own-location recognition.

3. Variations

The following describes variations to the embodiments of the present technology.

{Variations Associated with Own Location Recognition Methods and So On}

In the above description, an example was depicted in which the SLAM of stereo camera scheme based on two units of cameras is used; however, it is also practicable to recognize a solely recognized own location by use of the SLAM based on one or three or more units of cameras.

In the above description, an example was used in which the recognition block 32 executes motion matching, travel amount estimation, and location and attitude estimation by use of the images of adjacent frames (the one frame immediately in front of the current frame and the current frame); however, it is also practicable to execute this processing by use of the images that are separated by two or more frames (for example, the image N frames equal to or higher than 2 in front of the current frame and the image of the current frame). This holds true with the own-location confidence computation block 33.

Further, it is also practicable to recognize a solely recognized own location on the basis of an image taken from the own vehicle in another method than SLAM.

Normally, with SLAM, the absolute location (the own location) of the own vehicle is recognized with reference to the absolute location depicted on the global map; however, it is also practicable to recognize the absolute location with reference to the absolute location indicated in the locational information obtained by a GPS system or the like.

Further, in the first embodiment, it is practicable to always recognize a jointly recognized own location so as to output the own location having the maximum confidence from the solely recognized own location and the jointly recognized own location, for example.

Still further, in the first embodiment, if a solely recognized is less than the predetermined threshold value and a jointly recognized own location is recognized, then the jointly recognized own location may always be outputted, for example. In this case, the computation of the confidence in the relative location and the confidence in the jointly recognized own location may be omitted.

Yet further, in the second embodiment, a solely recognized own location, a jointly recognized own location, or a composite recognized own location that has the maximum confidence may be outputted, for example.

In addition, the confidence may be outputted to the subsequent stage of the information processing block 22 along with the own location, for example. Further, two or more own locations (for example, a solely recognized own location and a jointly recognized own location) may be outputted to the subsequent stage along with the confidence of each of these own locations, for example.

{Variation Associated with a Method of Obtaining the Absolute Location of a Surrounding Vehicle}

For example, the information processing system 11 may include the absolute location and the confidence thereof into a response signal to a location recognition enquiry signal. Consequently, the number o times communication is executed can be reduced.

Further, if the confidence in the own location is equal to or higher than the predetermined threshold value, the information processing system 11 may transmit a signal indicative of the own location to the surroundings, for example. Consequently, the surrounding vehicles can easily find a vehicle recognizing the absolute location having high confidence.

Still further, in the first embodiment, if the confidence in the absolute location of a vehicle being tracked is low, then the absolute location of a vehicle other than the vehicle being tracked may be obtained or the absolute location of each surrounding vehicle other than the vehicle being tracked may always be obtained regardless of the confidence in the absolute location of the vehicle being tracked, for example.

Yet further, in the second embodiment, the absolute location of the vehicle being tracked may be preferentially obtained in the same manner as the first embodiment, thereby recognizing the jointly recognized own location jointly with the vehicle being tracked, for example.

In addition, if a vehicle to travel with is known in advance when going on touring by two or more vehicles or the like, a group of vehicles to travel with may be set in advance, thereby transmitting and receiving the absolute location within the group, for example. Consequently, the processing of searching for a vehicle from which the absolute location is obtained may be omitted.

In this case, each vehicle making up the group may be configured to be recognizable from the outside, for example. For example, the information indicative of each vehicle making up the group may be transmitted to the information processing system 11 of another vehicle, thereby enabling the recognition of each vehicle belonging to the group through a display of each group or a wearable display via the information processing system 11.

Further, if, when the vehicles making up a group are traveling in a formation, another vehicle attempts to interrupt the formation, an alert signal or the like may be transmitted to the information processing system 11 of the interrupting vehicle, for example. In addition, an alert message or the like against the interruption may be displayed on the display or the wearable display of the interrupting vehicle through the information processing system 11 thereof.

Still further, the information about own location or relative location may be shared between two or more vehicles (two or more information processing systems 11 thereof) so as to correct the own location or the relative location, thereby enhancing the accuracy in the recognition of own locations.

Figure 9:
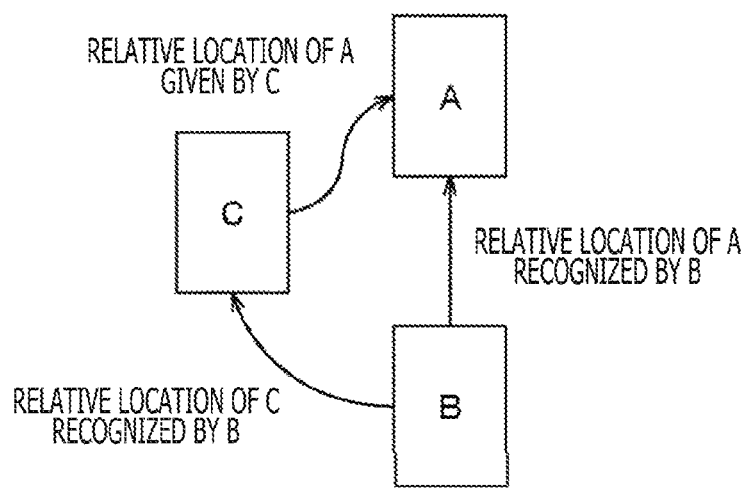
FIG. 9 is a diagram for describing an example in which two or more vehicles jointly recognize a relative location.

In the example depicted in FIG. 9, vehicle B recognizes a relative location of vehicle A relative to vehicle B and a relative location of vehicle C relative to vehicle B, for example. Vehicle C recognizes a relative location of vehicle A relative to vehicle C. Then, vehicle C transmits the relative location of the recognized vehicle A to vehicle B. On the basis of the relative location of vehicle A recognized by vehicle C and the relative location of vehicle C recognized by vehicle B, vehicle B computes the relative location of vehicle A. Here, if there is a difference between the relative location solely recognized by vehicle B and the relative location of vehicle A jointly recognized by vehicle B and vehicle C, vehicle B can understand that an error is generated on at least one of the three relative locations.

Therefore, vehicle B and vehicle C mutually correct the results of the recognition of each other's relative location so as to minimize the difference in the relative location of vehicle A solely recognized by vehicle B and the relative location of vehicle A jointly recognized by vehicle B and vehicle C, for example. Consequently, the accuracy in the recognition of relative locations is enhanced.

Further, in the above description, each vehicle (the information processing system 11 thereof) directly communicates with others by way of example; however, it is also practicable for each vehicle to execute communication through a server or a network so as to transmit and receive absolute locations.

{Variation Associated with a Method of Recognizing Surrounding Vehicles}

In the above description, an example in which surrounding vehicles are recognized by the number plates thereof; however, it is also practicable to identify surrounding vehicles by other methods.

Figure 10:
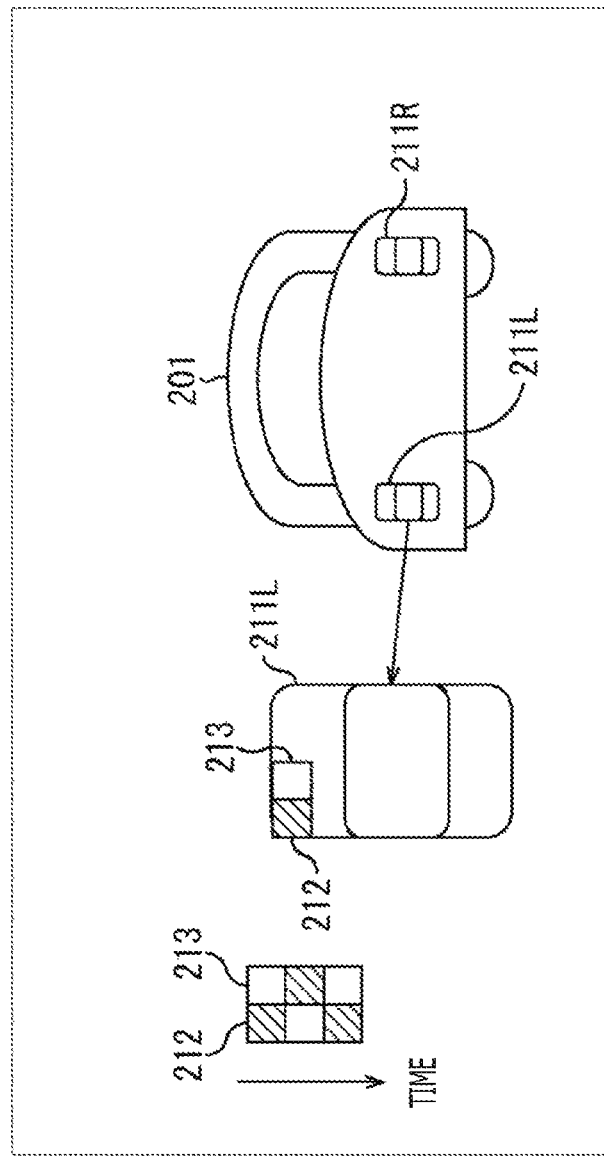
FIG. 10 is a diagram for describing another example in a method of recognizing surrounding vehicles.

For example, as depicted in FIG. 10, a light-emitting device that flashes at a high speed with a predetermined pattern may be arranged on or in the proximity of at least one of the tail-lights 211L and 211R at the rear of a vehicle 201. In the example depicted in FIG. 10, light-emitting devices 212 and 213 are arranged in the upper left corner of the tail-light 211L. Having the light-emitting devices 212 and 213 emit light in a pattern unique to each vehicle allows the sure identification of the vehicle 201, for example.

The light-emitting devices 212 and 213 facilitate the recognition of the location of the tail-light 211L, thereby enhancing the accuracy and speed in the recognition of the vehicle 201 and the relative location of the vehicle 201. Therefore, the confidence in the relative location of the vehicle on which the light-emitting devices 212 and 213 are arranged may be set higher than the confidence in the relative locations of other vehicles.

{Other Variations}

For example, the camera block 21 may be unitized with the information processing block 22 or separable therefrom.

{Application Range of the Present Technology}

In the above description, examples in which the own location of a vehicle is recognized are used; however, it is also practicable to apply the present technology to any case in which the own location of a moving body other than vehicles is recognized. Especially, the present technology is effective to cases where the present technology is applied to moving bodies moving in some cluster as with the case of vehicles with the moving bodies of which other moving bodies get in the field of vision in the travel direction of the cluster of moving bodies. For such moving bodies, human beings, airplanes, helicopters, drones, and robots are assumed, for example. In addition, the present technology is applicable regardless of the driving methods (autonomous driving, manual driving, remote control driving, etc., for example) of moving bodies that are riding vehicles.

It should be noted that, in the application of the present technology to another moving body, the information processing system 11 may also be arranged on each moving body as with the case in which the present technology is applied to vehicles. At this time, the information processing system 11 may be always arranged on a moving body or in a temporary, detachable, or portable manner.

Further, the information processing system 11 may also be configured by such a portable information terminal as a smartphone, a mobile telephone, a tablet, a wearable device, a note-type personal computer, for example, in addition to the above-mentioned in-vehicle information terminal.

Still further, the present technology is applicable not only to the recognition of the absolute locations of moving bodies but also the recognition of the attitude of the moving bodies. For example, on the basis of the absolute attitude of another moving body and the relative attitude of another moving body relative to the own moving body, the present technology allows the recognition of the absolute attitude of the own moving body.

4. Applications

{Exemplary Configuration of a Computer}

The above-mentioned sequence of processing operations can be executed by hardware or software. In the execution of the sequence of processing operations by software, the programs constituting that software are installed on a computer. The computer here includes a computer built in dedicated hardware, a general-purpose computer that can execute various functions by installing various programs, and so on.

Figure 11:
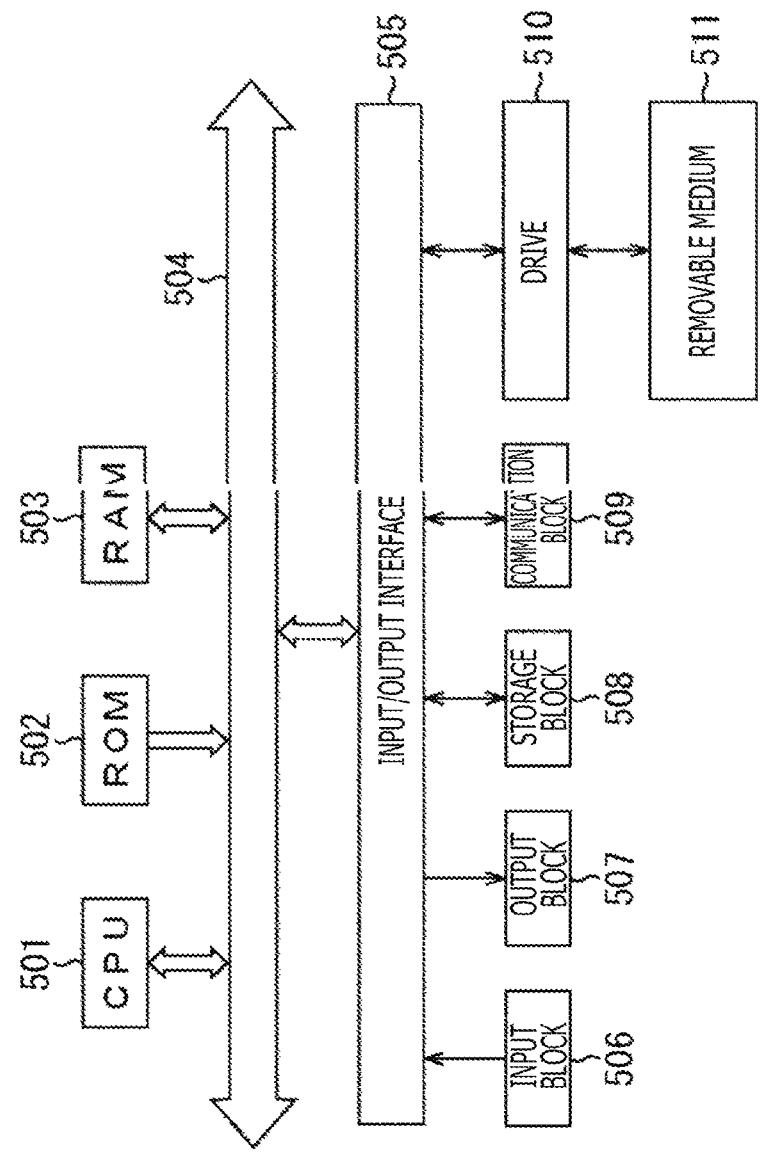
FIG. 11 is a block diagram illustrating an exemplary configuration of a computer.

FIG. 11 depicts a block diagram illustrating an example of a configuration of hardware of a computer that executes the above-mentioned sequence of processing operations by programs.

In the computer, a CPU (Central Processing Unit) 501, a ROM (Read Only Memory) 502, and a RAM (Random Access Memory) 503 are interconnected by a bus 504.

The bus 504 is further connected with an input/output interface 505. The input/output interface 505 is connected with an input block 506, an output block 507, a storage block 508, a communication block 509, and a drive 510.

The input 506 includes a keyboard, a mouse, a microphone, and so on. The output block 507 includes a display, a speaker, and so on. The storage block 508 includes a hard disk drive, a nonvolatile memory, and so on. The communication block 509 includes a network interface and so on. The drive 510 drives a removable medium 511 such as a magnetic disc, an optical disc, a magneto-optical disc, or a semiconductor memory.

With the computer configured as described above, the CPU 501 loads programs from the storage block 508 into the RAM 503 via the input/output interface 505 and the bus 504 and executes the loaded programs so as to execute the above-mentioned sequence of processing operations.

Programs to be executed by the computer (the CPU 501) may be provided as recorded to the removable medium 511 that is package medium or the like. In addition, programs may be provided through wired or wireless transmission medium, such as a local area network, the Internet, or digital satellite broadcasting.

With the computer, programs can be installed in the storage block 508 via the input/output interface 505 by loading the removable medium 511 on the drive 510. In addition, programs can be installed in the storage block 508 by receiving the programs at the communication block 509 via a wired or wireless transmission medium. Otherwise, programs can be installed in the ROM 502 or the storage block 508 in advance.

It should be noted that programs to be executed by the computer may be processed in a time sequence along an order described in the present description, in parallel to each other, or on an as-demanded basis.

Further, a system in the present description denotes an aggregation of two or more components (apparatuses, modules (parts), and the like), so that all components need not be collected in one housing. Therefore, two or more apparatuses accommodated in separate housings and interconnected via a network or one apparatus in which two or more modules are accommodated in one housing is a system.

In addition, the embodiments of the present technology are not restricted to those described above and therefore changes and variations may be made without departing from the gist of the present technology.

For example, the present technology may take a configuration of cloud computing in which one function is divided by two or more apparatuses via a network so as to be jointly processed.

Still further, the steps described in the above-mentioned flowcharts may be executed by one apparatus as well two or more apparatuses in a divided manner.

Yet further, if two or more processing operations are included in one step, the two or more processing operations included in that one step may be executed by one apparatus as well as two or more apparatuses in a divided manner.

{Exemplary Application to a Vehicle Control System}

As described above, the information processing system 11 may be realized as an apparatus that is installed on any types of vehicles, such as an automobile, an electric car, a hybrid electric car, and a motorcycle, for example.

Figure 12:
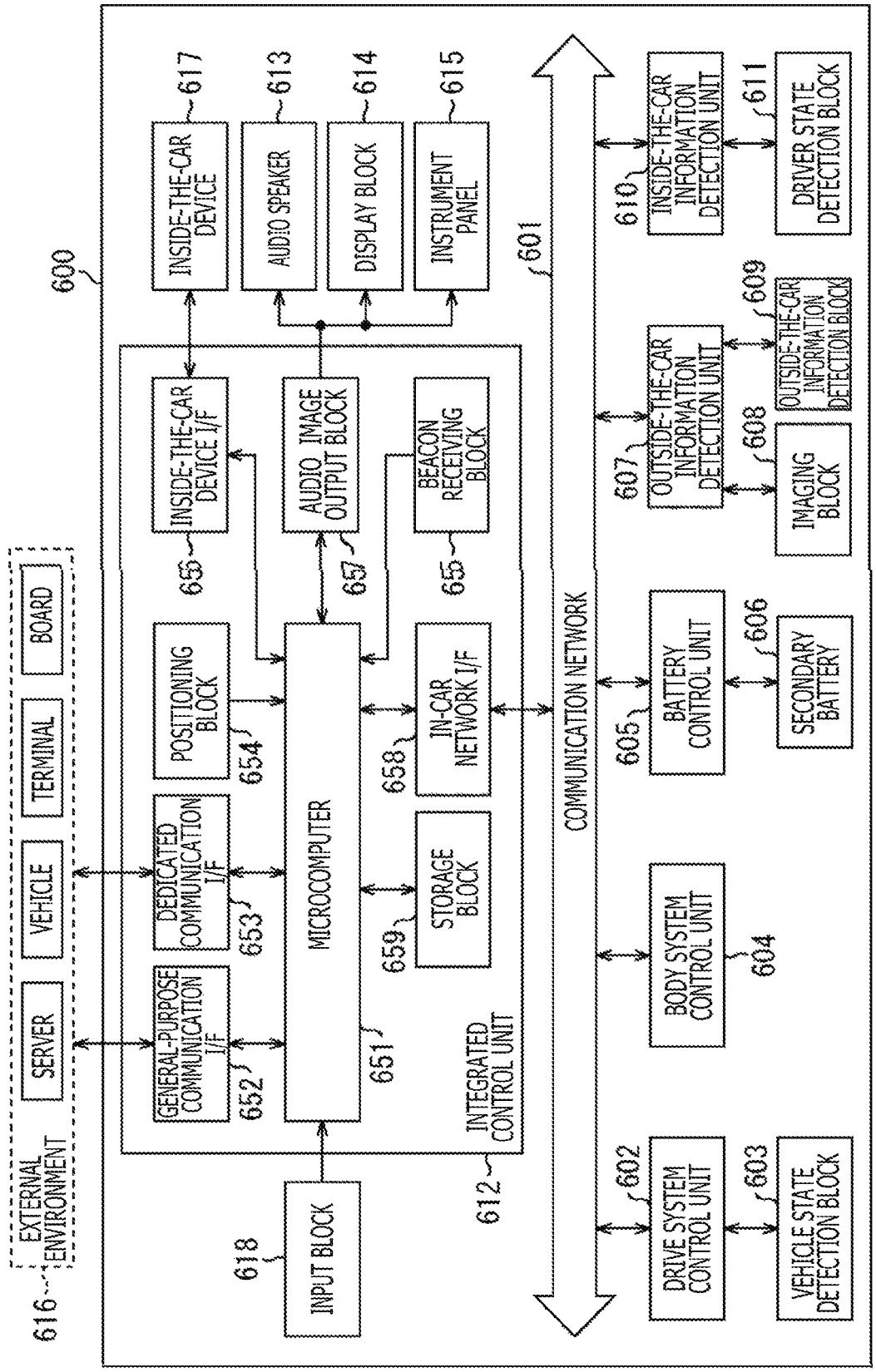
FIG. 12 is a block diagram illustrating one example of a schematic configuration of a vehicle control system.

FIG. 12 depicts a block diagram illustrating one example of a schematic configuration of a vehicle control system 600 to which the present technology is applicable. The vehicle control system 600 has two or more electronic control units interconnected via a communication network 601. In the example depicted in FIG. 12, the vehicle control system 600 has a drive system control unit 602, a body system control unit 604, a battery control unit 605, an outside-the-car information detection apparatus 607, an inside-the-car information detection apparatus 610, and an integrated control unit 612. The communication network 601 interconnecting these multiple control units may be an in-car communication network compliant with any standards such as CAN (Controller Area Network), LIN (Local Interconnect Network), LAN (Local Area Network), or FlexRay (registered trademark), for example.

Each control unit has a microcomputer for executing computational processing as instructed by various kinds of programs, a storage block for storing the programs to be executed by the microcomputer and parameters for use in various kinds of computation, and a drive circuit for driving apparatuses subject to various kinds of control operations. Each control unit has a network I/F for providing communication with other control units via the communication network 601 as well as a communication I/F for providing communication with apparatuses or sensors inside and outside the car in a wired or wireless manner. FIG. 12 depicts a microcomputer 651, a general-purpose communication I/F 652, a dedicated communication I/F 653, a positioning block 654, a beacon reception block 655, an inside-the-car device I/F 656, an audio image output block 657, an in-car network I/F 658, and a storage block 659 as a functional configuration of the integrated control unit 612. Likewise, the other control units each have a microcomputer, a communication I/F, a storage block, and so on.

The drive system control unit 602 controls the operations of apparatuses related with the drive system of a vehicle as instructed by various kinds of programs. For example, the drive system control unit 602 functions as a control apparatus for controlling a drive force generating apparatus that generates a vehicle drive force, a combustion engine or a driving motor, a drive force transmission mechanism that transmits the drive force to wheels, a steering mechanism that adjusts the steering angle of a vehicle, and a braking apparatus that generates a vehicle braking force. The drive system control unit 602 may have a function as the control apparatus for controlling ABS (Antilock Brake System) or ESC (Electronic Stability Control).

The drive system control unit 602 is connected to a vehicle state detection block 603. The vehicle state detection block 603 includes at least a gyro sensor for detecting angular speeds of vehicle axial rotational motion, an acceleration sensor for detecting vehicle acceleration, and a sensor for detecting accelerator pedal operational amount, brake pedal operational amount, steering wheel steering angle, engine RPM, or wheel RPM, for example. The drive system control unit 602 executes computational processing by use of signals entered from the vehicle state detection block 603, thereby controlling the combustion engine, the drive motor, the electrical power steering apparatus, and the brake apparatus.

The body system control unit 604 controls the operations of various apparatuses mounted on the vehicle body as instructed by various kinds of programs. For example, the body system control unit 604 functions as a control apparatus for controlling a key-less entry system, a smart-key system, a power window apparatus, such various kinds of lights as head-lights, back-lights, brake-lights, winkers, and fog-lights. In this case, the electromagnetic waves issued from a portable device used for the key or signals from various kinds of switches may be entered in the body system control unit 604. Receiving these electromagnetic waves and signals, the body system control unit 604 controls the vehicle door lock apparatus, the power window apparatus, and the lights.

The battery control unit 605 controls a secondary battery 606 that supplies power to the drive motor as instructed by various kinds of programs. For example, such information as battery temperature, battery output voltage or remaining battery charge is entered in the battery control unit 605 from a battery apparatus having the secondary battery 606. The battery control unit 605 executes computational processing by use of these signals, thereby controlling the temperature adjustment of the secondary battery 606 or the cooling apparatus of the battery apparatus, for example.

The outside-the-car information detection apparatus 607 detects the information related with the outside of a vehicle on which the vehicle control system 600 is arranged. For example, at least one of an imaging block 608 and an outside-the-car information detection block is connected to the outside-the-car information detection apparatus 607. The imaging block 608 includes at least one of a ToF (Time Of Flight) camera, a stereo camera, a monocular camera, an infrared camera, and so on. The outside-the-car information detection block 609 includes an environment sensor for detecting current weather or climate or a surroundings information detection sensor for detecting other vehicles around the vehicle on which the vehicle control system 600 is arranged, obstacles, pedestrians, and so on, for example.

The environment sensor may be at least one of a rain drop sensor for detecting rainfall, a fog sensor for detecting fog, a sunlight sensor for detecting sunlight intensity, and a snow sensor for detecting snowfall. The surroundings information detection sensor may be at least one of an ultrasonic sensor, a radar apparatus and a LIDAR (Light Detection and Ranging or Laser Imaging Detection and Ranging) apparatus. The imaging block 608 and the outside-the-car information detection block 609 may be arranged as discrete sensors or apparatuses or as an apparatus in which two or more sensors or apparatuses are integrated.

Figure 13:
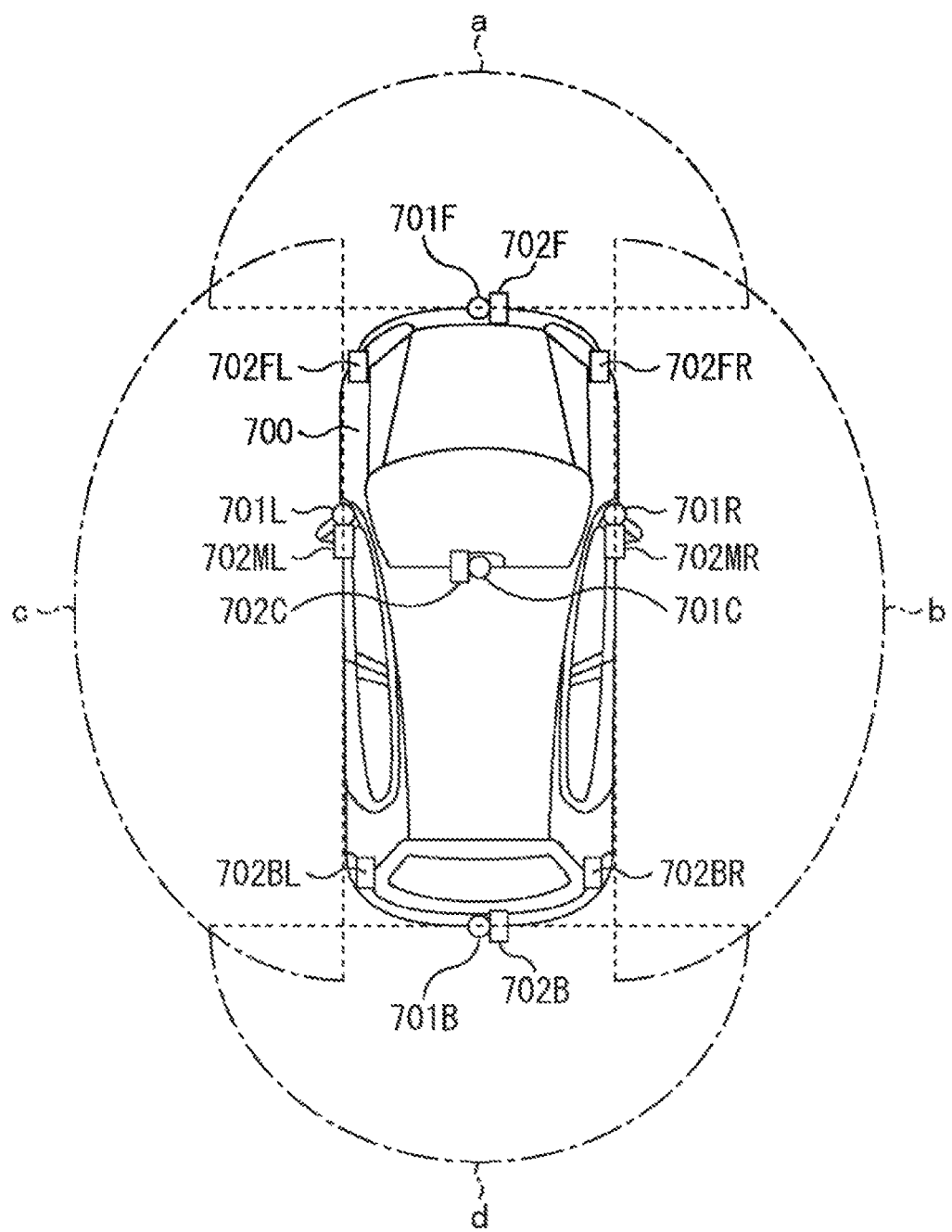
FIG. 13 is a diagram for describing one example in installation positions of an outside-the-car information detection block and an imaging block.

Here, FIG. 13 illustrates an example of the arrangement positions of the imaging block 608 and the outside-the-car information detection block 609. Imaging blocks 701F, 701L, 701R, 701B, and 701C are arranged on at least one of the front nose, the side mirrors, the rear bumper, the back door, and the upper section of the front glass inside the car of a vehicle 700, for example. The imaging block 701F arranged on the front nose and the imaging block 701C arranged on the upper section of the front glass inside the car mainly take images in the forward direction of the vehicle 700. The imaging blocks 701L and 701R arranged on the side mirrors mainly take images in the side directions of the vehicle 700. The imaging block 701B arranged on the rear bumper or the back door mainly takes images in the rear direction of the vehicle 700. The imaging block 701C arranged in the upper section of the front glass inside the car is mainly used for detecting preceding vehicles or pedestrians, obstacles, signal apparatuses, traffic signs or traffic lanes.

It should be noted that FIG. 13 depicts an example of imaging ranges of the imaging blocks 701F, 701L, 701R, and 701B. The imaging range "a" is indicative of the imaging range of the imaging block 701F arranged at the front nose, the imaging ranges "b" and "c" are indicative of the imaging ranges of the imaging blocks 701L and 701R arranged at the side mirrors, the imaging range "d" is indicative of the imaging range of the imaging block 701B arranged at the rear bumper or the back door. For example, superimposing the image data obtained through the imaging blocks 701F, 701L, 701R, and 701B provides a bird's-eye view image as looking at the vehicle 700 down from above.

The outside-the-car information detection blocks 702F, 702FL, 702FR, 702ML, 702MR, 702C, 702BL, 702BR, and 702B that are arranged on the front, the rear, the sides, the corners, and the upper section of the front glass inside the car of the vehicle 700 may be ultrasonic sensors or a radar apparatuses, for example. The outside-the-car detection blocks 702F, 702C, and 702B that are arranged on the front nose, the rear bumper, the back door and the upper section of the front glass inside the card of the vehicle 700 may be LIDAR apparatuses, for example. These outside-the-car information detection blocks 702F through 702B are mainly used for the detection of preceding vehicles, pedestrians, or obstacles.

Referring to FIG. 12 again, the description is continued. The outside-the-car information detection apparatus 607 makes the imaging block 608 take an image of the outside of the car and receives the taken image data. In addition, the outside-the-car information detection apparatus 607 receives the detection information from the connected outside-the-car information detection block 609. If the outside-the-car information detection block 609 is an ultrasound sensor, a radar apparatus, or a LIDAR apparatus, the outside-the-car information detection apparatus 607 radiates ultrasound wave or electromagnetic wave and, at the same time, receives the information of the received reflected wave. On the basis of the received information, the outside-the-car information detection apparatus 607 may execute the object detection processing for detecting persons, cars, obstacles, signs or characters on the road or execute distance detection processing. On the basis of the received information, the outside-the-car information detection apparatus 607 may execute environment recognition processing for recognizing rainfall, fog, or road conditions. On the basis of the received information, the outside-the-car information detection apparatus 607 may compute distances to objects outside the vehicle.

Further, on the basis of the received image data, the outside-the-car information detection apparatus 607 may execute image recognition processing for recognizing persons, cars, obstacles, signs or characters on the road or execute distance detection processing. The outside-the-car information detection apparatus 607 may execute distortion correction or alignment processing on the received image data and, at the same time, compose the image data taken by different imaging blocks 608, thereby generating a bird's-eye view image or a panoramic image. By use of the image data taken by different imaging blocks 608, the outside-the-car information detection apparatus 607 may execute viewpoint conversion processing.

The inside-the-car information detection apparatus 610 detects the information inside the car. The inside-the-car information detection apparatus 610 is connected with a driver state detection block 611 for detecting driver's conditions, for example. The driver state detection block 611 may include a camera for taking an image of the driver, a biosensor for detecting biometric information of the driver, and a microphone for picking up voice inside the car. The biosensor is arranged on the seat or the steering wheel, for example, so as to detect the biometric information of the seated passenger or the drive operating the steering wheel. On the basis of the detected information entered from the driver state detection block 611, the inside-the-car information detection apparatus 610 may compute the degree of fatigue or the degree of concentration of the driver or determine whether the driver is dozing or not. The inside-the-car information detection apparatus 610 may execute the processing such as noise cancelling on the picked up audio signal.

The integrated control unit 612 controls the overall operation in the vehicle control system 600 as instructed by various kinds of programs. The integrated control unit 612 is connected with an input block 618. The input block 618 is realized by such devices as a touch panel, buttons, a microphone, switches and levers that are operated by a person riding in the vehicle for input operations, for example. The input block 618 may be a remote control apparatus based on infrared ray or another electromagnetic wave, a mobile telephone compatible with the operation of the vehicle control system 600, or an externally connected device such as PDA (Personal Digital Assistant), for example. The input block 618 may be a camera, for example, in which a person in the vehicle can enter information by gesture. Further, the input block 618 may be an input control circuit that generates an input signal on the basis of the information entered by a person in the vehicle through the above-mentioned input block 618 and outputs the generated input signal to the integrated control unit 612, for example. Operating this input block 618, a person in the car and so on enter various kinds of data into the vehicle control system 600 and give instructions for the execution of processing operations.

The storage block 659 may include a RAM (Random Access Memory) for storing various kinds of programs to be executed by the microcomputer and a ROM (Read Only Memory) for storing various kinds of parameters, computation results or sensor values. In addition, the storage block 659 may be realized by a magnetic storage device such as HDD (Hard Disc Drive), a semiconductor storage device, an optical storage device, or a magneto-optical storage device.

The general-purpose communication I/F 652 is a general-purpose communication I/F that communicably mediates between various kinds of devices existing in external environment 616. The general-purpose communication I/F 652 may have a cellular communication protocol such as GSM (registered trademark) (Global System of Mobile communications), WiMAX, LTE (Long Term Evolution), or LTE-A (LTE-Advanced) or another wireless communication protocol such as wireless LAN (also referred to as Wi-Fi (registered trademark)). The general-purpose communication I/F 652 may be connected to a device (an application server or a control server, for example) existing on an external network (the Internet, a cloud network, or a carrier-unique network, for example) via a base station or an access point, for example. In addition, the general-purpose communication I/F 652 may be connected to a terminal existing in the proximity of the vehicle (a pedestrian terminal or a shop terminal or MTC (Machine Type Communication) terminal, for example) by use of P2P (Peer to Peer) technology, for example.

The dedicated communication I/F 653 is a communication I/F that supports a communication protocol specified for use in vehicles. The dedicated communication I/F 653 may have a standard protocol such as WAVE (Wireless Access in Vehicle Environment) that is a combination of lower-layer IEEE802.11p and upper-layer IEEE1609 or DSRC (Dedicated Short Range Communications), for example. The dedicated communication I/F 653 typically executes V2X communication that is a concept including one or more of communication between vehicles (Vehicle to Vehicle), communication between vehicle and road (Vehicle to Infrastructure), and communication between vehicle and pedestrian communication (Vehicle to Pedestrian).

The positioning block 654 receives a GNSS (Global Navigation Satellite System) signal from a GNSS satellite (for example, GPS (Global Positioning System) signal from GPS satellite) and executes positioning, thereby generating locational information including the longitude, latitude, and altitude of the vehicle. It should be noted that the positioning block 654 may identify the current location by exchanging signals with a wireless access point or obtain the locational information from a terminal such as a mobile telephone, a PHS, or a smartphone that have a positioning function.

The beacon reception block 655 receives radio or electromagnetic wave emitted from a wireless station arranged on a road or the like so as to obtain the information related with the current location, congestion conditions, traffic blockage, or required time, for example. It should be noted that the function of the beacon reception block 655 may be included in the dedicated communication I/F 653 described above.

The inside-the-car device I/F 656 is a communication interface that mediates the connection between the microcomputer 651 and various kinds of devices in the car. The inside-the-car device I/F 656 may establish wireless communication by use of a protocol such as wireless LAN, Bluetooth (registered trademark), NFC (Near Field Communication), or WUSB (Wireless USB). Further, the inside-the-car device I/F 656 may establish wired connection via a connection terminal (and, if necessary, a cable) not depicted. The inside-the-car device I/F 656 exchanges control signals or data signals with a mobile device or a wearable device of a person in the car or an information device carried into the car or installed therein, for example.

The in-car network I/F 658 is an interface that communicably mediates between the microcomputer 651 and the communication network 601. The in-car network I/F 658 transmits and receives signals and so on in accordance with a predetermined protocol supported by the communication network 601.

The microcomputer 651 of the integrated control unit 612 controls the vehicle control system 600 as instructed by various kinds of programs on the basis of the information obtained via at least one of the general-purpose communication I/F 652, dedicated communication I/F 653, positioning block 654, beacon reception block 655, the inside-the-car device I/F 656, and the in-car network I/F 658. For example, the microcomputer 651 may compute a control target value of the drive-force generating apparatus, the steering mechanism, or the brake mechanism on the basis of the obtained information of the inside and outside of the vehicle so as to output control instructions to the drive system control unit 602. For example, the microcomputer 651 may execute cooperation control intended for vehicle's collision avoidance or impact mitigation, follow-up travel based on vehicle-to-vehicle distance, speed-maintained travel, autonomous travel, and so on.

The microcomputer 651 may create local map information including the surroundings information of the current location of the vehicle on the basis of the information obtained via at least one of the general-purpose communication I/F 652, the dedicated communication I/F 653, the positioning block 654, the beacon reception block 655, the inside-the-car device I/F 656, and the in-car network I/F 658. In addition, the microcomputer 651 may predict hazards such as vehicle collision, approaching of pedestrians, or entry into blocked road on the basis of the obtained information, thereby generating an alert signal. The alert signal may be a signal for generating alert sound or turning on an alert light, for example.

The audio image output block 657 transmits an output signal of at least one of sound and image to an output apparatus enabled to notify a person in the vehicle or the outside thereof of the visual or audible information. In the example depicted in FIG. 12, the output apparatus is illustrated as realized by an audio speaker 613, a display block 614, and an instrument panel 615. The display block 614 may include at least one of on-board display and a head-up display, for example. The display block 614 may have an AR (Augmented Reality) display function. The output apparatus may be another apparatus such as a headphone, a projector, or a lamp that is other than the above-mentioned apparatuses. If the output apparatus is a display apparatus, then the display apparatus displays the results obtained by various kinds of processing operations executed by the microcomputer 651 or the information received from another control unit in various kinds of visual forms such as text, image, table, and graph. If the output apparatus is an audio output apparatus, then the audio output apparatus converts an audio signal based on reproduced audio data or acoustic data into an analog signal, thereby audibly outputting this analog signal.

It should be noted that, in the example depicted in FIG. 12, at least two control units interconnected via the communication network 601 may be unitized into one control unit. Alternatively, each individual control unit may be configured by two or more control units. Further, the vehicle control system 600 may have another control unit not depicted. In addition, in the above description, a part or all of the functions of any one of the control units may be allocated to another control unit. That is, as long as information can be transmitted and received via the communication network 601, predetermined computation processing may be executed in any control unit. Likewise, a sensor or an apparatus connected to any one of control units may be connected to another control unit and two or more control units may mutually transmit and receive detection information via the communication network 601.

In the vehicle control system 600 described above, the portion excluding the communication block 39 of the information processing block 22 depicted in FIG. 1 is applicable to the integrated control unit 612 depicted in FIG. 12, for example. In addition, the communication block 39 depicted in FIG. 1 is applicable to the general-purpose communication I/F 652 depicted in FIG. 12, for example. Further, the camera block 21 depicted in FIG. 1 is applicable to the imaging block 608 depicted in FIG. 12, for example. It should be noted that the camera block 21 is supposed to be arranged at the locations of the outside-the-car information detection blocks 702FL and 702FR depicted in FIG. 13.

Further, at least some of the components of the information processing block 22 may be realized in a module (an integrated-circuit module configured by one die, for example) for the integrated control unit 612 depicted in FIG. 12. Alternatively, the information processing block 22 may be realized by two or more control units of the vehicle control system 600 depicted in FIG. 12.

It should be noted that the computer programs for realizing the functions of the information processing block 22 may be installed in any control unit. In addition, a computerreadable recording medium in which the above-mentioned programs are stored can be provided. This recording medium is a magnetic disc, an optical disc, a magneto-optical disc, or a flash memory, for example. Further, the above-mentioned computer program may be distributed via a network without using recording medium, for example.

It should also be noted that the effects described in the present description are illustrative only and therefore not restricted thereto; namely, any other effects may be provided.

Further, the present technology can also take the following configuration.

(1)

An information processing apparatus arranged on a moving body, the information processing apparatus including:

an own-location recognition block configured to recognize, on the basis of an image taken from the moving body, a first own location that is an absolute location of the moving body;

a moving body recognition block configured to recognize a relative location relative to the moving body of another moving body in the image taken from the moving body;

a communication block configured to execute communication with the another moving body so as to obtain the absolute location of the another moving body; and an own location computation block configured to compute, on the basis of the absolute location of the another moving body and the relative location of the another moving body, a second own location that is an absolute location of the moving body.

(2)

The information processing apparatus described in (1) above, further including:

a first confidence computation block configured to compute a first confidence that is a confidence in the first own location.

(3)

The information processing apparatus described in (2) above, further including:

a second confidence computation block configured to compute a confidence in a relative location of the another moving body, in which the reception block further obtains a confidence in an absolute location of the another moving body; and the own location computation block computes, on the basis of the confidence in the relative location of the another moving body and the confidence in the absolute location of the another moving body, a second confidence that is a confidence in the second own location.

(4)

The information processing apparatus described in (3) above, further including:

an output control block configured to control, on the basis of the first confidence and the second confidence, outputting of the first own location and the second own location.

(5)

The information processing apparatus described in (3) above, in which the own location computation block computes, on the basis of the first own location, the second own location, the first confidence, and the second confidence, a third own location that is an absolute location of the moving body.

(6)

The information processing apparatus described in (5) above, further including:

an output control block configured to control outputting of the third own location.

(7)

The information processing apparatus described in (2) above, further including:

an output control block configured to control, on the basis of the first confidence, outputting of the first own location and the second own location.

(8)

The information processing apparatus described in any one of (2) through (7) above, in which, if the first confidence is lower than a predetermined threshold value, the moving body recognition block recognizes a relative location of the another moving body, the communication block communicates with the another moving body so as to obtain an absolute location of the another moving body, and the own location computation block computes the second own location.

(9)

The information processing apparatus described in any one of (1) through (8) above, in which the communication block enquires whether a moving body around the moving body recognizes an absolute location or not and obtains an absolute location from the moving body recognizing the absolute location.

(10)

The information processing apparatus described in any one of (1) through (9) above, in which the recognition block recognizes, on the basis of a feature point inside an image taken from the moving body and a relative location relative to the moving body, a location of the moving body.

(11)

An information processing method including the steps of, the steps being executed by an information processing apparatus arranged on a moving body:

recognizing, on the basis of an image taken from the moving body, a first own location that is an absolute location of the moving body;

recognizing a relative location relative to the moving body of another moving body in the image taken from the moving body;

executing communication with the another moving body so as to obtain the absolute location of the another moving body; and computing, on the basis of the absolute location of the another moving body and the relative location of the another moving body, a second own location that is an absolute location of the moving body.

REFERENCE SIGNS LIST

11 . . . Information processing system, 21 . . . Camera block, 22 . . . Information processing block, 32 . . . Recognition block, 33 . . . Own-location confidence computation block, 34 . . . Vehicle recognition block, 35 . . . Relative-location confidence computation block, 36 . . . Own-location computation block, 37 . . . Output control block, 39 . . . Communication block, 102 . . . Feature point detection block, 105 . . . Feature amount computation block, 108 . . . Travel amount estimation block, 112 . . . Location and attitude estimation block

The invention claimed is:

1. An information processing apparatus arranged on a first moving body, the information processing apparatus comprising:

a central processing unit (CPU) configured to:

recognize, based on an image taken from the first moving body, a first own location that is a first absolute location of the first moving body;

compute a confidence in the first own location;
recognize a relative location of a second moving body relative to the first moving body based on the confidence in the first own location, wherein the relative location of the second moving body is recognized in the image taken from the first moving body;
execute communication with the second moving body to obtain an absolute location of the second moving body; and
compute, based on the absolute location of the second moving body and the relative location of the second moving body, a second own location of the first moving body, wherein the second own location is a second absolute location of the first moving body.

2. The information processing apparatus according to claim 1, wherein the CPU is further configured to:
compute a confidence in the relative location of the second moving body;
obtain a confidence in the absolute location of the second moving body; and
compute a confidence in the second own location based on the confidence in the relative location of the second moving body and the confidence in the absolute location of the second moving body.

3. The information processing apparatus according to claim 2, wherein the CPU is further configured to:
control outputting output of the first own location and the second own location based on the confidence in the first own location and the confidence in the second own location.

4. The information processing apparatus according to claim 2, wherein
the CPU is further configured to compute a third own location based on the first own location, the second own location, the confidence in the first own location, and the confidence in the second own location, and
the third own location is a third absolute location of the first moving body.

5. The information processing apparatus according to claim 4, wherein the CPU is further configured to control output of the third own location.

6. The information processing apparatus according to claim 1, wherein the CPU is further configured to control output of the first own location and the second own location based on the confidence in the first own location.

7. The information processing apparatus according to claim 1, wherein based on the confidence in the first own location lower than a threshold value, the CPU is further configured to:
recognize the relative location of the second moving body;
communicate with the second moving body to obtain the absolute location of the second moving body; and
compute the second own location.

8. The information processing apparatus according to claim 1, wherein the CPU is further configured to:
enquire that the second moving body around the first moving body recognizes the absolute location of the second moving body; and
obtain the absolute location of the second moving body from the second moving body based on the recognition of the absolute location.

9. The information processing apparatus according to claim 1, wherein the CPU is further configured to recognize the relative location of the second moving body based on a feature point inside the image taken from the first moving body.

10. An information processing method, comprising:
in an information processing apparatus arranged on a first moving body:
recognizing, based on an image taken from the first moving body, a first own location that is a first absolute location of the first moving body;
computing a confidence in the first own location;
recognizing a relative location of a second moving body relative to the first moving body, wherein the relative location of the second moving body is recognized in the image taken from the first moving body;
executing communication with the second moving body to obtain an absolute location of the second moving body; and
computing, based on the absolute location of the second moving body and the relative location of the second moving body, a second own location of the first moving body, wherein the second own location is a second absolute location of the first moving body.

11. An information processing apparatus arranged on a first moving body, the information processing apparatus comprising:
a central processing unit (CPU) configured to:
recognize, based on an image taken from the first moving body, a first own location that is a first absolute location of the first moving body;
recognize a relative location of a second moving body relative to the first moving body, wherein the relative location of the second moving body is recognized in the image taken from the first moving body;
execute communication with the second moving body to enquire that the second moving body around the first moving body recognizes an absolute location of the second moving body;
obtain the absolute location of the second moving body from the second moving body based on the recognition of the absolute location; and
compute, based on the absolute location of the second moving body and the relative location of the second moving body, a second own location of the first moving body, wherein the second own location is a second absolute location of the first moving body.

* * * * *